US008335786B2

(12) United States Patent
Pereira et al.

(10) Patent No.: US 8,335,786 B2
(45) Date of Patent: Dec. 18, 2012

(54) MULTI-MEDIA CONTENT IDENTIFICATION USING MULTI-LEVEL CONTENT SIGNATURE CORRELATION AND FAST SIMILARITY SEARCH

(75) Inventors: Jose Pio Pereira, Cupertino, CA (US); Sunil Suresh Kulkarni, Santa Cruz, CA (US); Shashank Merchant, Sunnyvale, CA (US); Prashant Ramanathan, Mountain View, CA (US); Pradipkumar Dineshbhai Gajjar, Sunnyvale, CA (US)

(73) Assignee: Zeitera, LLC, Mountain View, CA (US)

( * ) Notice: Subject to any disclaimer, the term of this patent is extended or adjusted under 35 U.S.C. 154(b) by 182 days.

(21) Appl. No.: 12/788,796

(22) Filed: May 27, 2010

(65) Prior Publication Data
US 2010/0306193 A1    Dec. 2, 2010

Related U.S. Application Data

(60) Provisional application No. 61/181,806, filed on May 28, 2009.

(51) Int. Cl.
    *G06F 17/30* (2006.01)
(52) U.S. Cl. ........................ 707/728; 707/747
(58) Field of Classification Search .......... 707/728–730, 707/747
    See application file for complete search history.

(56) References Cited

U.S. PATENT DOCUMENTS

| | | | | |
|---|---|---|---|---|
| 7,289,643 B2* | 10/2007 | Brunk et al. | | 382/100 |
| 7,549,052 B2* | 6/2009 | Haitsma et al. | | 713/180 |
| 7,650,616 B2* | 1/2010 | Lee | | 725/19 |
| 2005/0044561 A1* | 2/2005 | McDonald | | 725/18 |
| 2006/0129822 A1* | 6/2006 | Snijder et al. | | 713/176 |
| 2007/0071330 A1* | 3/2007 | Oostveen et al. | | 382/228 |
| 2009/0304082 A1* | 12/2009 | Radhakrishnan et al. | | 375/240.15 |
| 2009/0324199 A1* | 12/2009 | Haitsma et al. | | 386/95 |
| 2010/0066759 A1* | 3/2010 | Zhang | | 345/620 |
| 2010/0205174 A1* | 8/2010 | Jiang et al. | | 707/725 |

OTHER PUBLICATIONS

Job Oostveen et al., "Feature Extraction and a Database Strategy for Video Fingerprinting", Springer Publishing, Visual 2002 (2002), LNCS 2314, pp. 117-128.*

Julien Law-To et al., "Video Copy Detection: A Comparative Study", ACM CIVR '07, Jul. 9-11, 2007, pp. 371-378.*

Sunil Lee & Chang D. Yoo, "Robust Video Fingerprinting for Content-Based Video Identification", IEEE Transactions on Circuits and Systems for Video Technology, Jul. 2008, 18(7):983-988.*

(Continued)

*Primary Examiner* — Cheryl Lewis
*Assistant Examiner* — Scott A Waldron
(74) *Attorney, Agent, or Firm* — Law Offices of Peter H. Priest, PLLC

(57) ABSTRACT

A method is presented for large media data base query and media entry identification based on multi-level similarity search and reference-query entry correlation. Media content fingerprinting detects unique features and generates discriminative descriptors and signatures used to form preliminary reference data base. The preliminary reference data base is processed and a subset-set of it is selected to form a final reference data base. To identify a media query a fast similarity search is performed first on the reference database resulting in a preliminary set of likely matching videos. For each preliminary likely matching video a further multi-level correlation is performed which includes iterative refinement, sub-sequence merging, and final result classification.

23 Claims, 14 Drawing Sheets

TF: Term Frequency
IDF: Inverse Document Frequency
DB: Database

OTHER PUBLICATIONS

Joly, Alexis et al. "Statistical similarity search applied to content-based video copy detection", Proceedings of the 21st International Conference on Data Engineering, 2005 IEEE Computer Society, p. 1285.

Lowe, David G., "Object Recognition from Local Scale-Invariant Features", Proc of the International Conference on Computer Vision, vol. II, Sep. 1999, p. 1150.

Sivic, Josef et al., "Video Google: A Text Retrieval Approach to Object Matching in Videos", Proceedings of the Ninth IEEE International Conference on Computer Vision, 2003, http://doi.ieeecomputersociety.org/10.1109/ICCV.2003.1238663.

Fechteler, Philipp et al., "Fast and High Resolution 3D Face Scanning", IEEE International Conference, San Antonio, Texas, Nov. 12, 2007, vol. III, pp. 81-82.

* cited by examiner

Information for generation of
descriptors for a detected feature

Video / Media / Object Database Organization and Sequence / Object Detection

Video / Media / Object Database Organization and Sequence / Object Detection in a Distributed System TF: Term Frequency
IDF: Inverse Document Frequency
DB: Database TF: Term Frequency
IDF: Inverse Document Frequency
DB: Database Fast Database Update Object Detection

MULTI-MEDIA CONTENT IDENTIFICATION USING MULTI-LEVEL CONTENT SIGNATURE CORRELATION AND FAST SIMILARITY SEARCH

This application claims the benefit of U.S. Provisional Patent Application Ser. No. 61/181,806 entitled "Multi-Media Content Identification Using Multi-Level Content Signature Correlation and Fast Similarity Search" filed on May 28, 2009 which is hereby incorporated by reference in its entirety.

CROSS REFERENCE TO RELATED APPLICATION

U.S. application Ser. No. 12/141,337 filed on Jun. 18, 2008 entitled "Method and Apparatus for Multi-dimensional Content Search and Video Identification", and U.S. application Ser. No. 12/612,729 filed Nov. 5, 2009 entitled "Digital Video Content Fingerprinting Based on Scale Invariant Interest Region Detection with an Array of Anisotropic Filters", U.S. application Ser. No. 12/772,566 filed on May 3, 2010 entitled "Media Fingerprinting and Identification System", U.S. Provisional Patent Application Ser. No. 61/266,668 filed on Dec. 4, 2009 entitled "Digital Video Content Fingerprinting Using Image Pixel Intensity and Color Information", U.S. Provisional Patent Application Ser. No. 61/321,223 filed on Apr. 6, 2010 entitled "Digital Video Fingerprinting Using Motion Segmentation", and U.S. Provisional Patent Application Ser. No. 61/321,169 filed on Apr. 6, 2010 entitled "Digital Audio Content Fingerprinting" have the same assignee as the present application, are related applications, and are hereby incorporated by reference in their entirety.

FIELD OF THE INVENTION

The present invention generally relates to information retrieval systems including systems related to complex objects, multi-dimensional data, rich media, and video. More particularly, the present invention addresses multi-media content identification using multi-level content signature correlation and fast similarity search methods.

BACKGROUND OF THE INVENTION

Media applications which include video and audio database management, database browsing and identification are undergoing explosive growth and are expected to continue to grow. To address this growth, there is a need for a comprehensive solution related to the problem of creating a video sequence database and identifying, within such a database, a particular video sequence or sequences that are tolerant of media content distortions. Multiple applications include video database mining, copyrighted content detection for video hosting web-sites, contextual advertising placement, and broadcast monitoring of video programming and advertisements.

The accuracy of identifying an entry in a large multimedia data base is significantly dependent on the uniqueness of information representing a particular item of multimedia data. Similarly the computational complexity to identify a multimedia entry is significantly dependent on the uniqueness and robustness of the information representing multimedia data contained in a large data base.

Increasing demand for such solutions, which include standard definition (SD) and high definition (HD) formats of video, requires increasing sophistication, flexibility, and performance in the supporting algorithms and hardware. The sophistication, flexibility, and performance that are desired exceed the capabilities of current generations of software based solutions, in many cases, by an order of magnitude.

SUMMARY OF THE INVENTION

In one or more of its several aspects, the present invention addresses problems such as those described above. To such ends, an embodiment of the invention addresses method of preprocessing media content for storage in a media reference database. A signature term frequency (STF) is generated for each signature, wherein the STF represents a measure of uniqueness for each signature as compared to existing signatures in the media reference database. Each signature is entered in the media reference database whose STF is less than a specified threshold, wherein the prespecified threshold represents a level of information content and uniqueness for a signature.

Another embodiment of the invention addresses a method to detect a query sequence of audio and video signatures in a data base of audio and video signatures. The database of audio and video signatures is searched in response to a query sequence of audio and video signatures using a hash index for each query signature. A set of database signatures is retrieved that are similar as determined by a distance measure of the signatures to the query sequence of audio and video signatures in response to use of the hash index for each query signature to select a database entry. A correlation in time is performed between corresponding pairs of signatures from the set of database signatures and the query sequence of audio and video signatures. A matching sequence between query and reference is identified if the correlation in time generates a score above a determined threshold.

Another embodiment of the invention addresses a method of generating a likelihood score for a pair of query media frame content items and correlating between matching frames of the query and reference media content frames. A correlation score is generated based on an individual frame or view similarity score, wherein the frame correlation score can be generated from a correlation between multiple signatures of different features of the query and original frame. A time correlation is generated using relative differences in frame numbers of the original video and the query video. A correlation is generated between the original video and the query video by using a correlation of individual frames alone and without using a time sequence in the query and in the reference media content frames, wherein the reference media content frames is an entry in a reference media database.

A further embodiment of the invention addresses a method of performing very fast sequence correlation. A fast similarity search is performed using a direct hash index of signatures to identify the likely matching chapters of the query and reference. A sequence correlation is performed on a reference chapter and query chapter. The fast similarity search and correlation on separate partitions or servers is performed in parallel. The detected sequences are thresholded to eliminate sequences. The best matches are selected.

These and other features, aspects, techniques and advantages of the present invention will be apparent to those skilled in the art from the following detailed description, taken together with the accompanying drawings and claims. As will be realized, the invention is capable of other and different embodiments and its several details are capable of modification in various other respects, all without departing from the present invention. Accordingly, the drawings and detailed description are to be regarded as illustrative in nature and not as restrictive.

DETAILED DESCRIPTION

Figure 1:
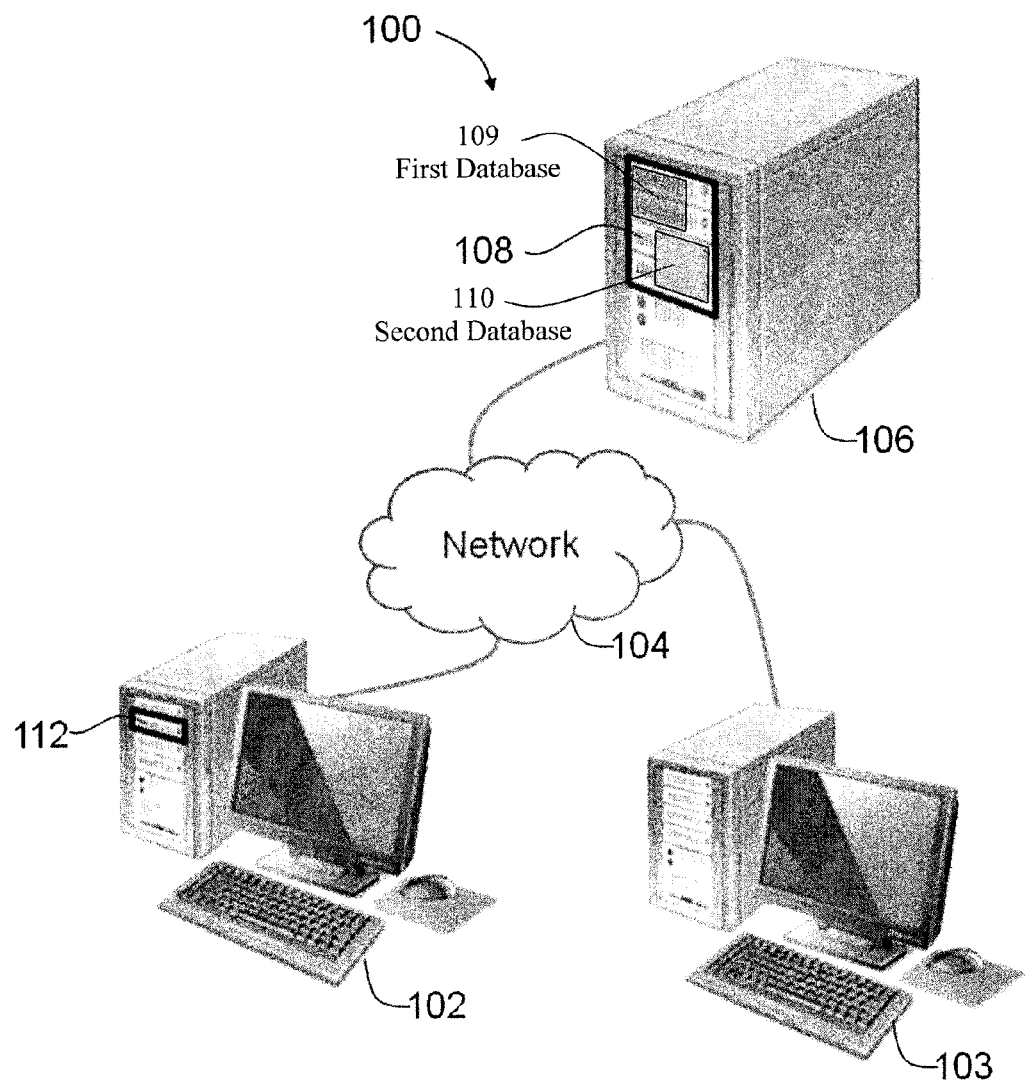
FIG. 1 illustrates a multi-dimensional content search system for media fingerprint (signature) generation, correlation of queries and data base entries for media content identification in accordance with the present invention.

The present invention will now be described more fully with reference to the accompanying drawings, in which several embodiments of the invention are shown. This invention may, however, be embodied in various forms and should not be construed as being limited to the embodiments set forth herein. Rather, these embodiments are provided so that this disclosure will be thorough and complete, and will fully convey the scope of the invention to those skilled in the art.

Natural information may be described by multi-dimensional feature vectors. The use of multi-dimensional feature vectors allows for compact storage of the large quantity and diversity of natural information in a database which aids in providing search facilities. For example, to identify media content, such as objects, video sequences, bio-molecular structures, or to detect actions and behavior, a multi-dimensional search may be based on various characteristics of the natural information that are detected and stored, such as, various types of measurements, specified features, structural characteristics, a sequence of images, and the like. Various methods can be used to extract such discriminating features about the media clip or object.

The accuracy of detected object features is significantly dependent on the information extracted to describe the object. The ability to detect features of an object with high accuracy improves the likelihood of identifying a searched for query object when severe distortions, occlusions, noise affects the query object source. Similarly, computational complexity to identify an object is significantly dependent on how unique and robust the information extracted is that describes the object. For example, a phoneme detector could be used for speech detection. The phoneme detector could use harmonic cues to enhance detection of phonemes. For audio detection, linear chirp detection may also be used to extract features identified to be of interest to an audio detection facility. A shift invariant discrete waveform transform could also be used to detect features in audio stream.

For video identification, features can be detected using various approaches such as blob or keypoint detection across a set of filter scales, or using segmentation and contours to identify an object. A combination of algorithms may be used including motion segmentation and the above methods to provide highly accurate feature and object detection. For example, signatures may be derived from detected motion between frames of a video sequence. Motion signatures for a video sequence can also be extracted by using statistical data or object tracking data. Another approach describes regions around a keypoint or selected patches in a frame as words and hence the information of a frame or video sequence may be indexed on a word by word basis. The above approach uses a keypoint detection algorithm to detect points of interest and describe a patch around a keypoint.

The invention described uses a reference database of signatures representing any general media content. During a query with a media clip, a series of steps are made for reference database search, classification, and correlation of the query media clip with the reference database to identify the matching content.

Video identification databases are generated from local signatures of prominent objects which are generated from keypoints identified in the video sequence. Signatures of prominent objects may also be derived from detected motion between video frames in a sequence. Also, signatures may be derived from selected video frames and from any differentiating features such as color, and text and audio information. In general, each reference database entry includes a signature and associated data at a leaf node of a hierarchical organized reference database.

For object identification, a reference database is constructed based on a set of views of the object, using feature detection on each of these views, generating signatures, and then adding selected signatures to the reference database. The signatures include associated data such as scale, viewpoint, and location of feature for each view.

The description describes, in more detail below, signature selection and database statistical methods that are used to select signatures or weight signatures in the database(s). Further, included are descriptions of signature correlation, correlation ensemble and classifier for video or object identification.

FIG. 1 illustrates a multi-dimensional content search system 100 for multi-media content identification using multi-level content signature correlation and fast similarity search in accordance with the present invention. The system 100 includes user sites 102 and 103, a server 106, a video database 108, and a correlation and similarity system 112 implemented as a program and operated, for example, by user site 102. The correlation and similarity system 112 may also be implemented in a server environment, for example on server 106 having the video database 108, with a link provided for search, correlation, and similarity facilities to multiple users. A network 104, such as the Internet, a wireless network, or a private network, connects sites 102 and 103 and server 106. Each of the user sites, 102 and 103 and server 106 may include a processor complex having one or more processors, having internal program storage and local user controls such as a monitor, a keyboard, a mouse, a printer, and may include other input or output devices, such as an external file storage device and communication interfaces.

The user site 102 may comprise, for example, a personal computer, a laptop computer, set-top, game machines, mobile smart-phones, or the like equipped with programs and interfaces to support data input and output and video fingerprinting and search monitoring that may be implemented both automatically and manually. The user site 102, for example, may store programs, such as the correlation and similarity system 112 program implementation of a content based video identification process of the present invention or have access to such programs through electronic media, such as may be downloaded over the Internet from an external server, accessed through a universal serial bus (USB) port from flash memory, accessed from disk media of various types, or the like. The system 100 may also suitably include more servers and user sites than shown in FIG. 1. Also, multiple user sites each operating an instantiated copy or version of the correlation and similarity system 112 may be connected directly to the server 106 while other user sites may be indirectly connected to it over the network 104.

The video database 108 is organized into two separate databases storing signatures or fingerprints of multi-media content, though a single database may be utilized having the capacity, functionality, and features of the two separate databases. A first database 109 may be accessed using a hash index extracted from the query media content. A hash index is a generated index value that is used for direct database access. This first database 109 is used in a first step in identifying sections of matching videos. A second database 110 is constructed from different index based on an identified video sequence or object and a location or a chapter within the identified video sequence or viewpoint of the object.

User sites 102 and 103 may generate user video content which is uploaded over the Internet 104 to a server 106 for storage in a video database 108. The user sites 102 and 103, for example, may also operate a correlation and similarity system 112 to generate signatures or fingerprints and search for video content in the video database 108. The correlation and similarity system 112 in FIG. 1 is scalable, supports a scalable database, and utilizes highly accurate video fingerprinting, correlation, and similarity technology that checks unknown video content against a database of previously fingerprinted video content, which is considered a reference or "golden" database. As the database increases in capacity, the correlation and search system is minimally affected, though increased data processing may affect performance depending upon processor support. For example, while capacity may increase, processor subsystems may be changed to increase performance using multi-core processors and the like. The correlation and similarity system 112 is different from commonly deployed systems in that it extracts features from the video itself. The correlation and similarity system 112 allows the server 106 to configure a reference database specific to its business requirements. The user site 102 that is configured to connect with the network 104, uses the correlation and similarity system 112, which may reside locally on the user site 102 or on the server 106, to compare video streams against a database of signatures in the video database 108, that has been previously generated.

Figure 2A:
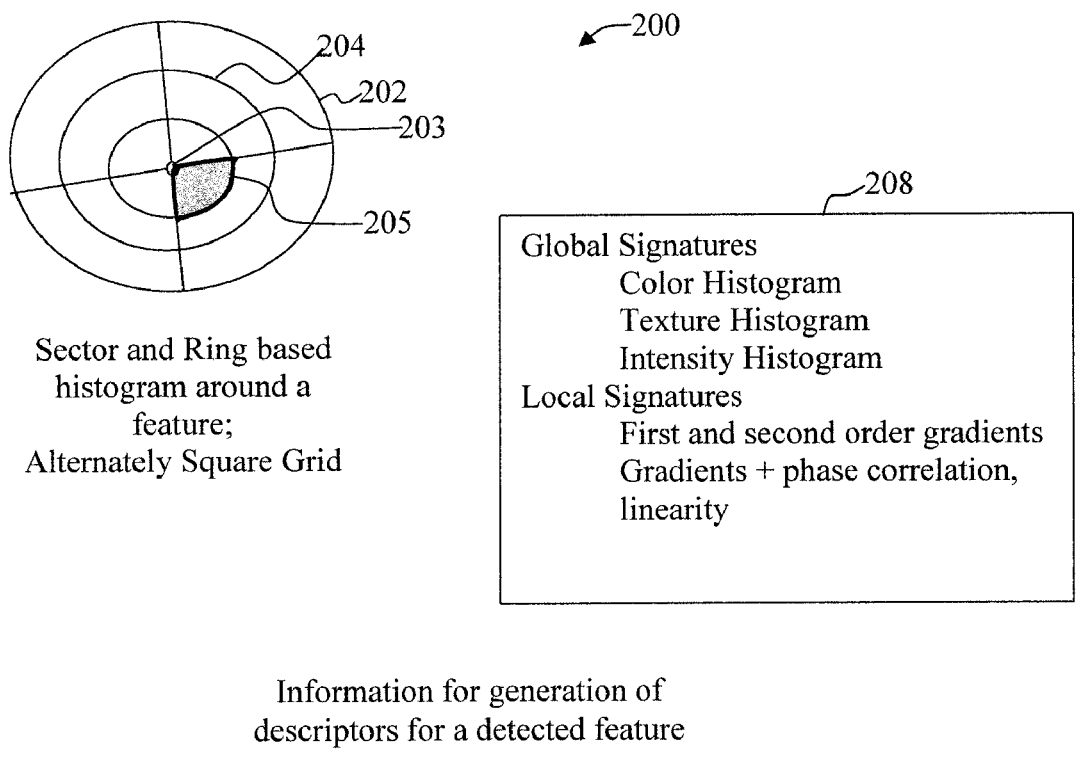
FIG. 2A illustrates some examples of regions of interest, and global and local features of image or video sequence or object used to generate descriptors, traversal indexes, and signatures in accordance with the present invention.

FIG. 2A illustrates some examples 200 of regions of interest 202 around a selected point 203, and global and local features 208 of image or a video sequence or another multimedia object used to generate descriptors, traversal indexes, and signatures in accordance with the present invention. The region around the selected point is divided into circles, such as rings 204, of linearly increasing radius. The ideal radius of the rings is a logarithmic function for each ring increasing in size away from the center, however this function is not robust to centering error. Hence the radius is generated instead by a linear function that is more robust and tolerates centering error. Centering error may occur, for example, due to slight time differences between matched video frames. Each ring is divided in to multiple regions call sectors, such as sector 205. Based on an analysis of the descriptors, global signatures may be generated. For example, global features such as color, texture, and intensity histograms may be used in the signature generation process. Global features relate to information related to the complete frame rather than a specific keypoint or specific region, for example, as describe in U.S. Provisional Patent Application Ser. No. 61/266,668 filed on Dec. 4, 2009 entitled "Digital Video Content Fingerprinting Using Image Pixel Intensity and Color Information" which is incorporated by reference. Features such as texture, and image brightness, or gradients, phase and linear correlation can be used to create a descriptor. Refer to U.S. application Ser. No. 12/772,566 filed on May 3, 2010 entitled "Media Fingerprinting and Identification System" which is incorporated by reference. Local signatures may also be generated based on first and second order gradients and also based on gradients plus phase correlation and linearity evaluations. The traversal index is also generated using the generated descriptors.

Figure 2B:
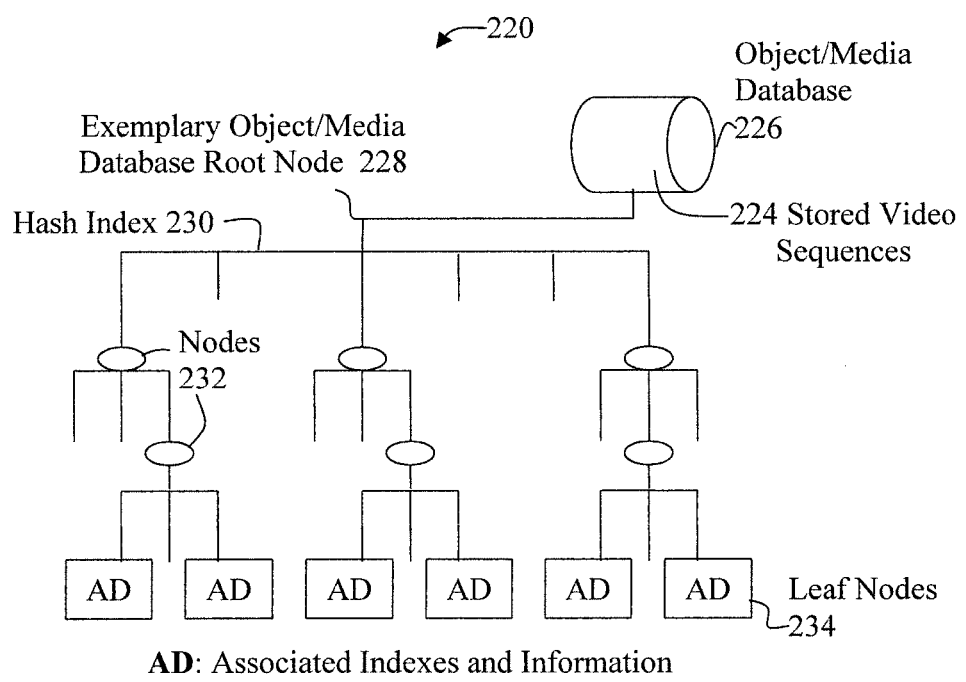
FIG. 2B illustrates a hierarchical multimedia data base data structure including hash indexes for access to and traversal from a root node across distributed nodes and to leaf nodes storing associated data and associated indexes.

FIG. 2B illustrates a hierarchical data structure 220 for a stored multi-dimensional object 224 selected from a video database 226 using hash indexes 230 for access to and traversal from a root node 228 across distributed nodes 232 to leaf nodes 234 storing associated data and associated indexes in accordance with the present invention. For example, each of the leaf nodes 234 in FIG. 2B having the associated data and indexes could also include texture information or object location and size information. A traversal index is a direct address or a hash index to a corresponding leaf node. In this embodiment, the traversal indexes are equivalent to the hash or direct address of the leaf node.

Figure 8:
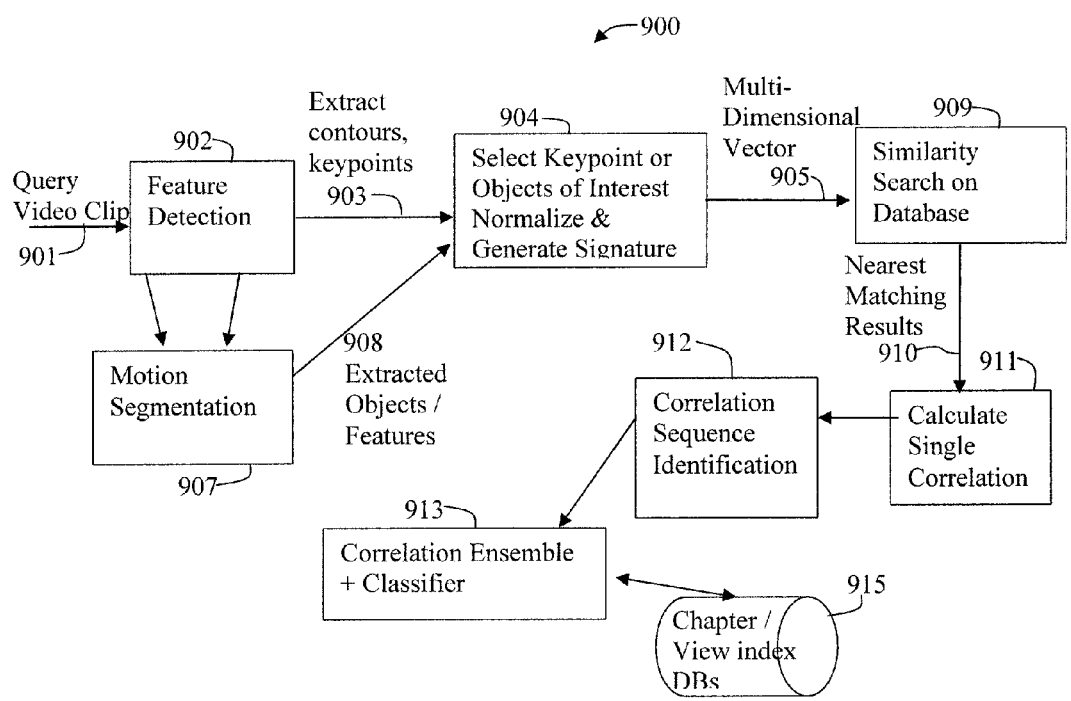
FIG. 8 shows an video identification method wherein reference content or image sequence is fingerprinted, data base is formed, similarity search and correlation are performed in accordance with the present invention.

A signature term frequency (STF) in a selected data base is the number of times a specific entry or term appears in the selected data base at distance less than a prespecified limit. A signature can be compared in a non-exact way, by taking certain distance measures with respect to all signatures in the database. Determining how similar a signature is to other signatures in the database may be based on a difference of bits, noted as a bit error, between an input signature and the other signatures in the database. The difference in bits may be measured as a hamming distance or as a Euclidian distance, such as using the L2 norm in general, between two signatures. An inverse data base entry frequency (IDSF) is a measure of the general importance of the term which may be obtained by dividing a number of data base entries by a number of data base entries containing the term, and then taking the logarithm of that quotient. Alternately, other functions of the quotient can be used to calculate the IDSF. For example, one or more area-based shape signatures may be selected when a signature term frequency (STF), as described in further detail below with regard to FIG. 4 and FIG. 8 is large, exceeding a threshold, for example, indicating that an evaluated signature is not very unique.

One embodiment of the invention addresses a method of organization of a multimedia database using a compact hash as a traversal index for each of the entries generated for the multimedia clip. Multiple associated data or signatures are stored at a leaf node, such as leaf node 234 of FIG. 2B.

Figure 3B:
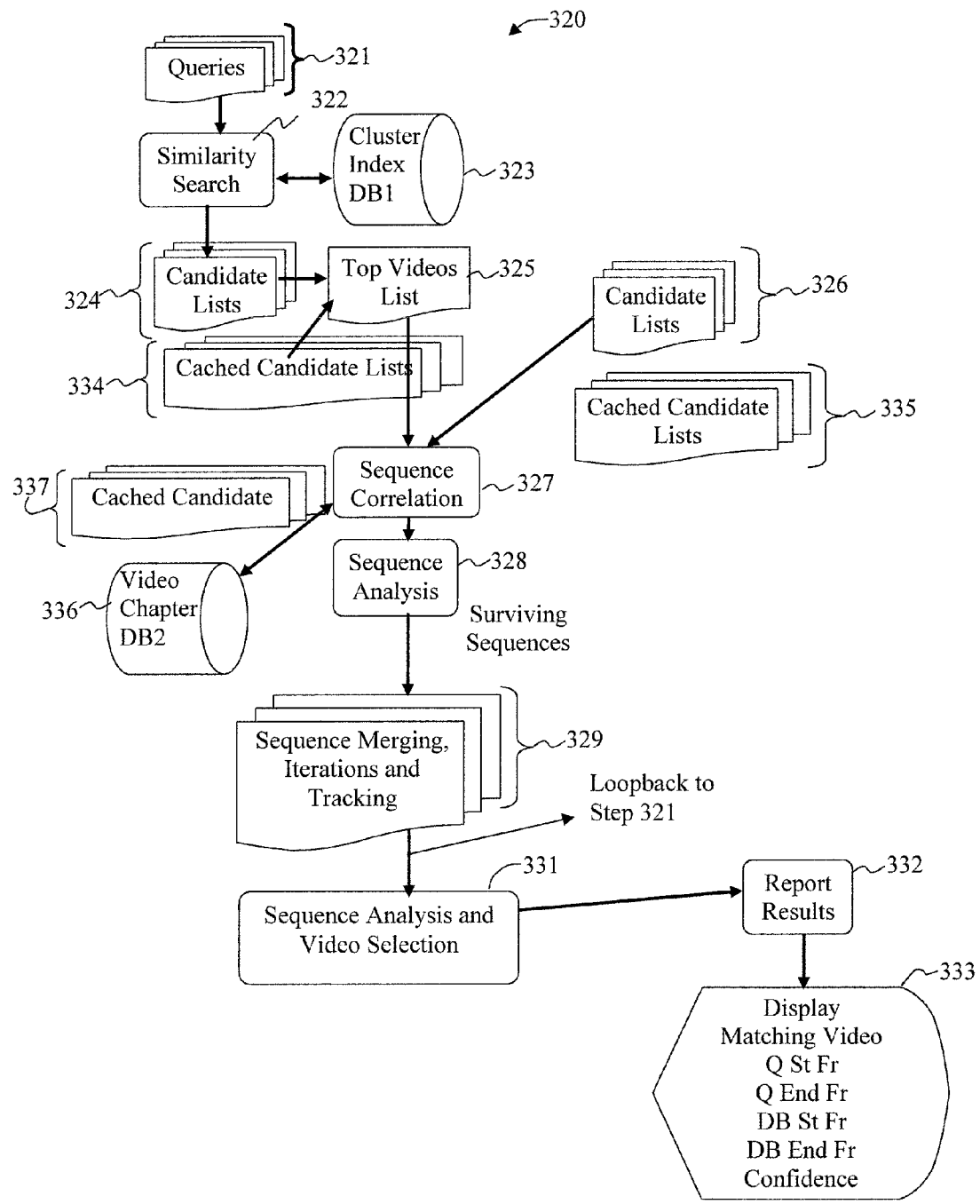
FIG. 3B illustrates an alternate method to identify a query video sequence from video sequences in a database in accordance with the present invention.
Figure 4A:
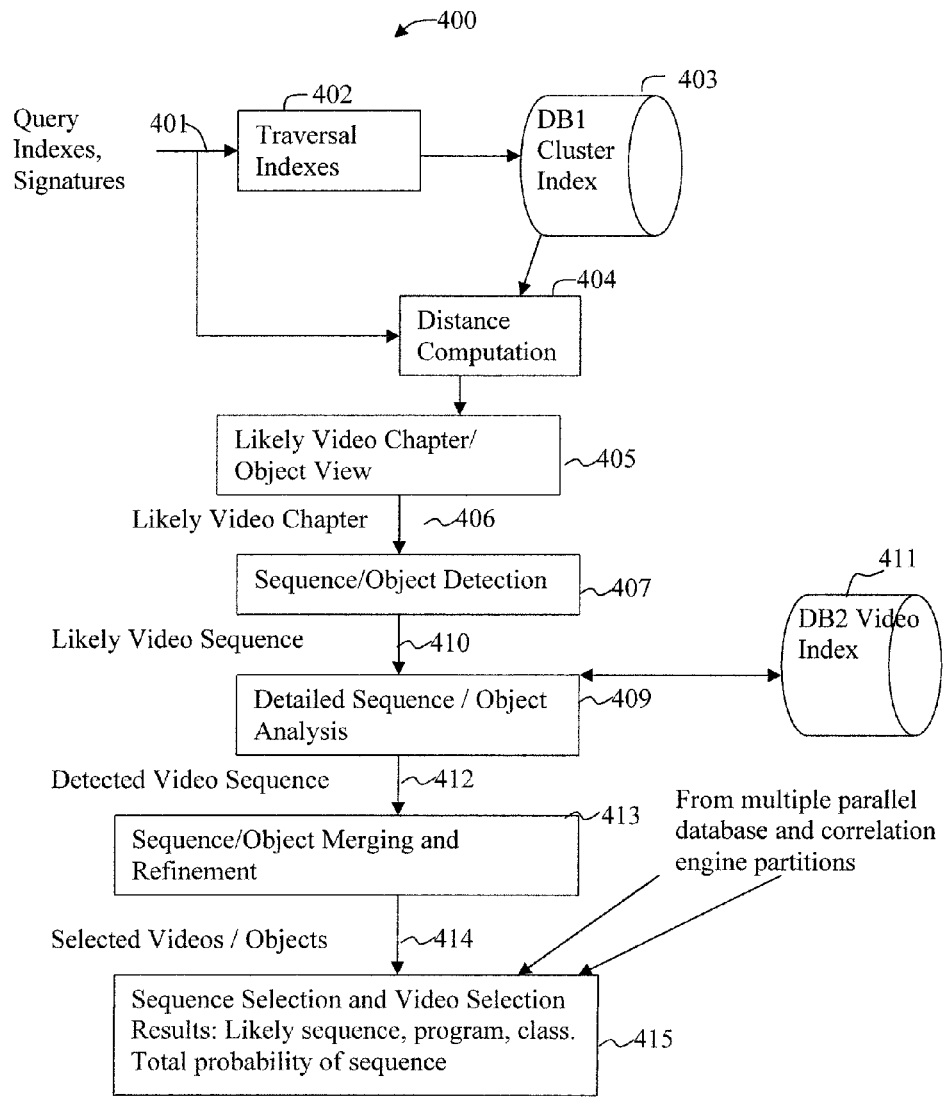
FIG. 4A illustrates a method to identify a query video sequence from the video sequences in a distributed database or partitioned, parallelized data base in accordance with the present invention.
Figure 4B:
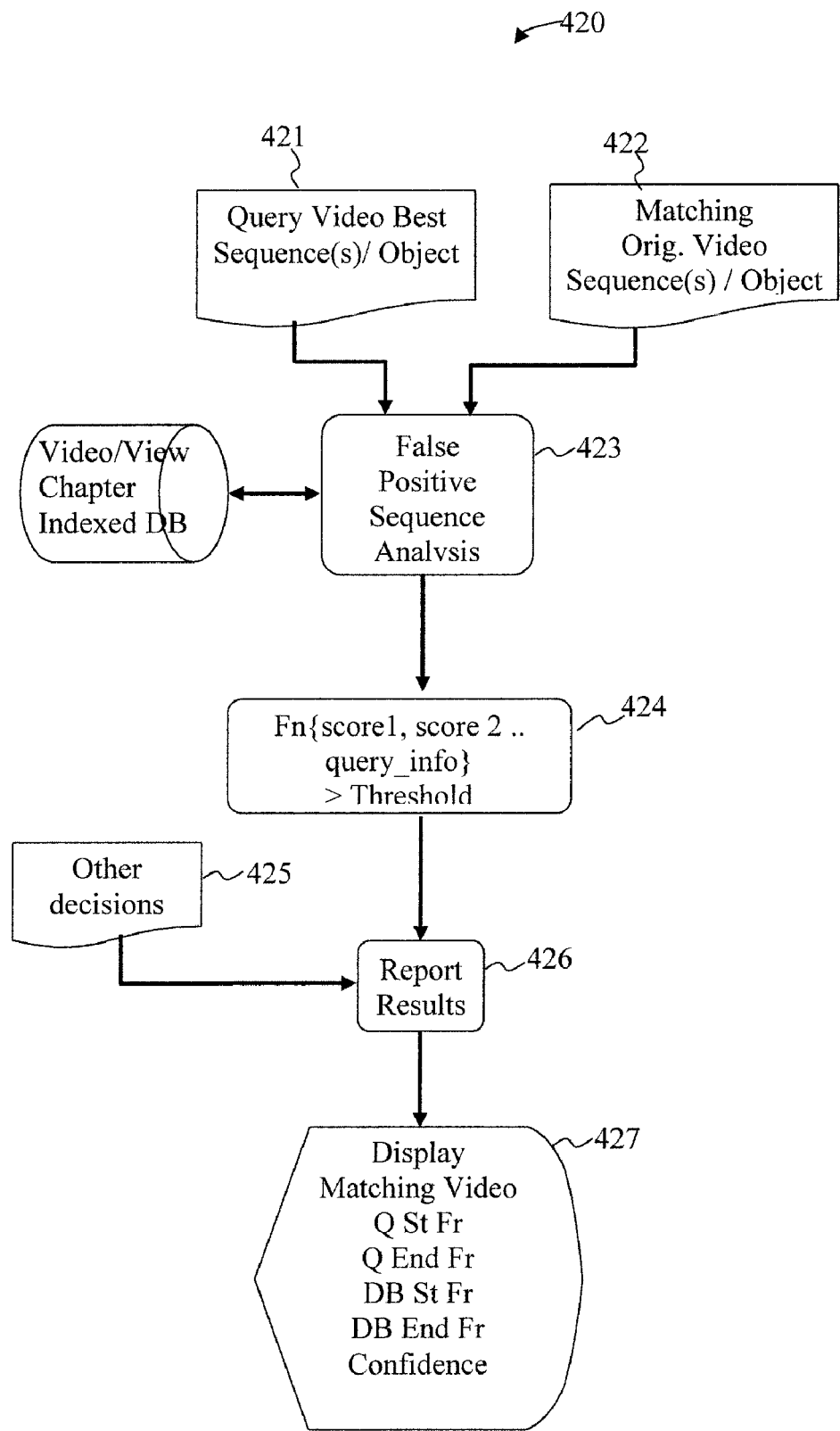
FIG. 4B illustrates a correlation and classification method to determine the likelihood of a match between segments of query video and reference video in accordance with the present invention.
Figure 5:
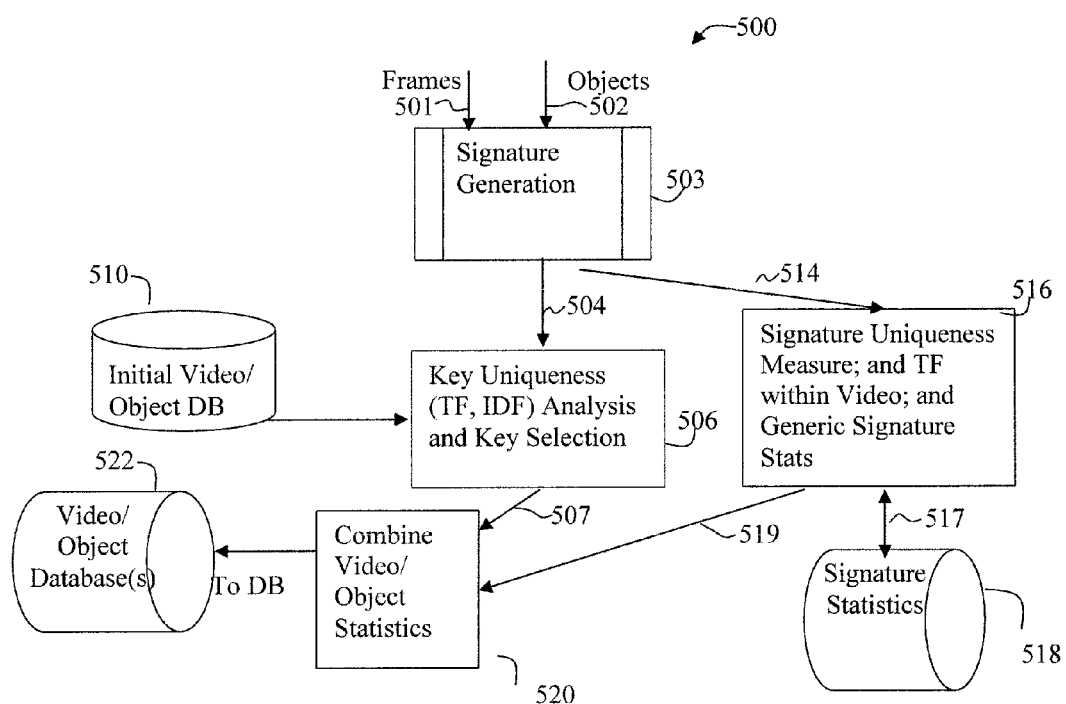
FIG. 5 illustrates a method used to select database signatures to increase information content and increase the likelihood of differentiating between the many video sequences stored in accordance with the present invention.

Another embodiment of the invention addresses a method of media fingerprinting or signature post-processing, similar to uniqueness analysis in step 506 in FIG. 5, and similar to step 424 in FIG. 4B, that is used to increase accuracy and confidence of determining a match. For example, a distance measure between signatures of a multimedia query clip and a reference multimedia clip is calculated. Information content in the signatures is evaluated and then used for correlation between a multimedia query clip and a reference database entry to provide a factor in determining a sequence correlation score. If the query's information content is low, the factor will be lower and the strength of the match is lower. For example if a video query is of a still image, then the information content of the video query sequence is lower since the video frames are the same during most of the query. For example, in step 327 of FIG. 3B, a video sequence correlation in time is provided by using differences in video frame numbers between pairs of matching query signatures and reference signatures and multiplying them with the query uniqueness factor and matching score for each individual query signature. A method to calculate an individual query uniqueness factor compares each signature of a current query frame to its nearest signature and geometric location in a previous query frame and evaluates a sum of differences value. The sum of differences value is divided by a product of an average error expected and the number of signatures and, for example represents a query uniqueness factor. The matching score is used to quantize the strength of a match between a query and a reference. The matching score for each query signature is accumulated based on the correlation. For a time sequence correlation the score is accumulated for each query signature based on the individual query signature match along a matching time line.

Another embodiment of the invention addresses a method of generating a likelihood score similar to step 424 of FIG. 4B between matching frames of a query video and a reference video. A correlation score is generated for the best matching sequence based on an individual frame similarity score.

Figure 3A:
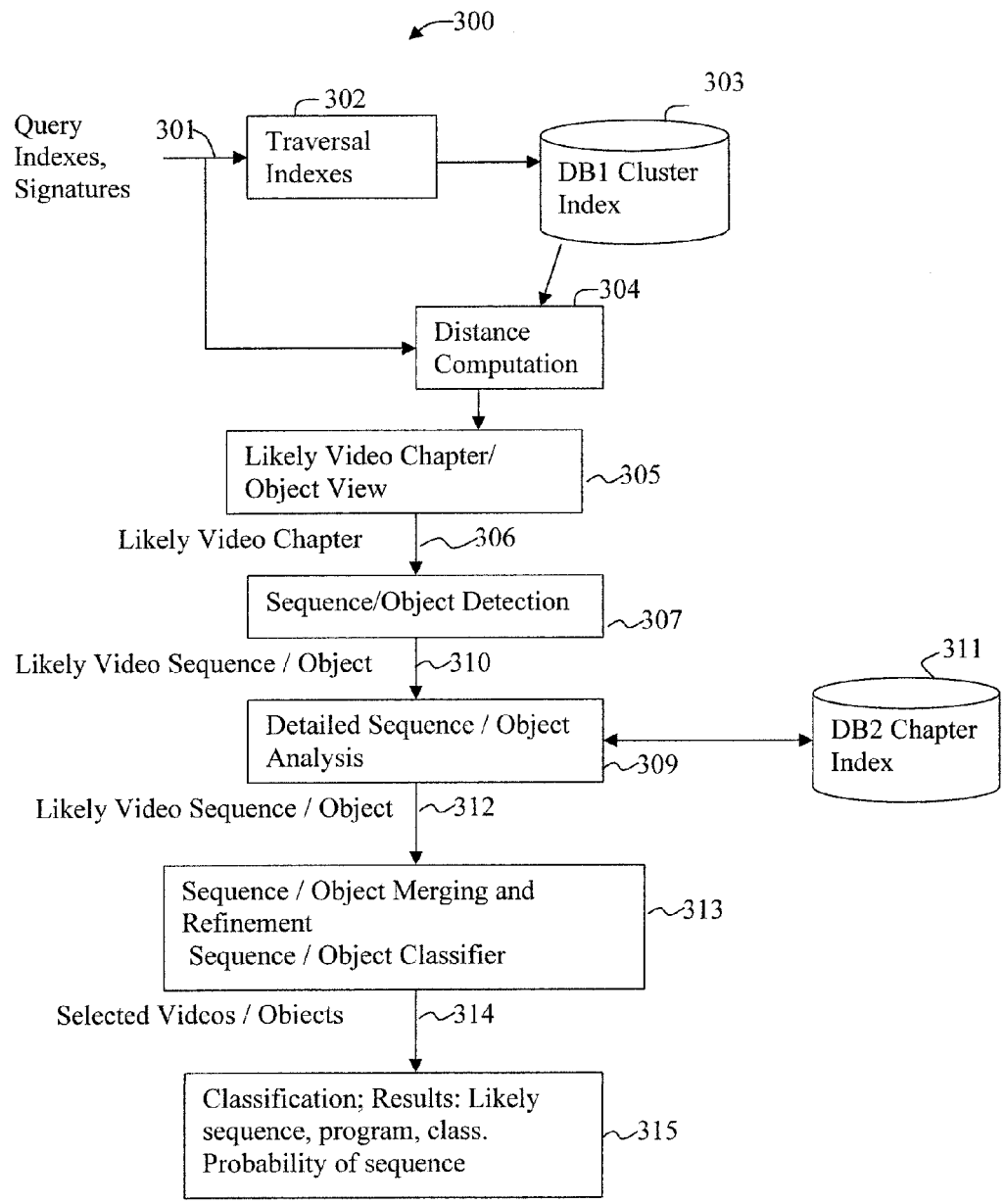
FIG. 3A illustrates a method to identify a query video sequence from video sequences in a database in accordance with the present invention.

FIG. 3A illustrates a method 300 used to identify a query video sequence from a plurality of video sequences in a video database. As a general overview of the method 300, for every selected frame in the query video sequence, a video database search is performed. The video database initial similarity search can be performed very efficiently using the hashed indexes described above. The closest matching reference data base video signatures form a collection of signatures for each query video frame. These collections of reference signatures are correlated with subsequent query frames until correlation is complete.

A selected set of query indexes and signatures 301 in FIG. 3A are derived from a query video sequence and used to search for a similar video sequence. The database of signatures is organized into two separate databases, such as the first database 109 and the second database 110 of FIG. 1. A first database is indexed in step 303 using a hash index. This first database is used in a first step in identifying sections of matching videos. A second database is constructed from a different index based on an identified video sequence or object and a location or a chapter within the identified video sequence or viewpoint of the object and is accessed in step 311.

For each query video sequence, certain frames are identified. For each of these selected frames, signatures are generated for certain extracted features of the frame or frames around the selected frame. For each of the signatures, a traversal index is also generated. This traversal index is used to access the database efficiently. Also, the database of signatures of reference videos is also indexed by the traversal indexes computed. The word traverse is used to describe operations that involve the stepping from node to node of the database until the individual elements of the database are reached. The traversal indexes and the signatures are computed in step 302 from media features descriptors. For each of the signatures and traversal indexes of the query, a range or a nearest neighbor database search and associated query operation is performed. This database search operation involves database traversal and similarity search and a list of likely entries in the database are identified that are within the search criteria.

At step 303, a first database access is performed, which involves reading the leaf nodes for associated data. Then, in step 304, a distance measure or error between the individual query signatures and the likely database signatures is computed. The index of the database which is accessed in step 303 is generated directly from the content. A query index, one of the selected set of query indexes and signatures 301, is also generated from content, and the traversal index access 302, is used to access the database 303. Other attributes of the extracted feature such as spatial location, size, and bright blob or dark blob, and or color information can be used to contribute to the first database (DB1) index.

The distance measure is generally defined as $L_p$ normalized where $L_1$ normalized is the sum of differences between a query signature vector (Q) and a reference video signature vector (R) for each dimension of the signature vector. For example, $L_1$ (Query, Reference)=sum (Qi−Ri) for dimensions "i" in a signature vector. Where Qi is the value of the query vector for the corresponding reference video feature/frame in a selected dimension i, and Ri is the value of the reference video feature/frame vector for at the same dimension i.

At step 305, the matching signatures are processed to select the most likely matching video/audio sequences and their corresponding chapters. Each video can be divided into multiple sections based on time called chapters. From these selected sets of matching reference video chapters and associated query, a longer query is constructed and a fast similarity search performed using an exact matching technique.

At step 307, the candidate set for the selected video chapters with extended queries is then correlated. At step 307, the time location of the detected sequence is then inferred from the inputs of the matching signatures. Step 307 is generally performed on signatures that agree at the index level, and hence is a very fast operation, since it is performed on a small set of signatures. After step 307, it can be inferred that a certain section of query matches an exact time section of the reference video. Then detailed analysis and refining of the matching sequences can be performed by using all the signatures that are available for the matching query and reference time line.

The operations of computing a correlation score between a query video sequence or frame and the reference video are performed in step 309. Step 309 generally uses the most relevant signatures to refine the match and for a false positive analysis. For example, a reference matches with a query which is a cropped version of the reference. In this case, geometric alignment is inferred from all the matching signatures. Also, in this case, only signatures in the reference that align to cropped boundaries of the query are used in the false positive analysis. The step 309 involves further calculations to extend the correlation results generated initially when the signature level correlation for the query and reference video is performed in step 307. The above correlations of step 307 identify a small set of likely matching video sequences or frames. For each likely matching video, the probability of matching between query and reference video is calculated and a correlation score is generated in step 307. The signature level correlation scores from step 309 identify similar video frames between a query and an reference video. Step 309 is also used for refining the match location, and for a false positive analysis.

For every likely matching of the reference video with the query video, a more detailed correlation between the query video and reference video is performed using the video index database at step 311. The video index database accessed in step 311 is indexed based on video identity and time of the video frame.

In step 313, false positive analysis is performed between the matching video segments or matching video frames and other orthogonal features of the video such as color, audio.

The computation of the correlation score of a sequence based on time correlation is described below. The time correlation score and sequence score defined below are calculated in step 307 and also in steps 309, and 313. The sequence score and threshold are generally recalculated when needed. Also, the individual correlation, sequence score, and sequence threshold equations are generally used together.

corr_score_$Q0$_$DB0$ is the time correlation score between a query video segment and an reference video segment.

$$\text{corr\_score\_}Q0\_DB0 = \Sigma\{\max(Eij^*((Si\text{-sigma})(Sj\text{-sigma})/K)^*(1-DTij)^2\} \quad \text{(eqn 1)}$$

where $Eij$=entropy between correlated queries i and j; the entropy is calculated as the signature bit difference between neighboring queries i and j
$Si$=the similarity score of item "i" of the matching sequence between query and reference video signatures,
$Sj$=the similarity score of item "j" of the matching sequence between query and reference video signatures, $$\text{Similarity score} = \text{MaxScore} - \Sigma(\text{over bits 0 to } L-1)(QSig\{i\} \text{ XOR } RSig\{i\}) \quad \text{(eqn 2)}$$

Where $QSig(t)$ is Query Signature, and $RSig\{i\}$ is Reference Signature for ith matching item; and there are L bits in the signature.
Sigma=is a constant,
$DTij$=is the frame correlation between queries i and j and the associated reference video frames for the queries i and j $$DTij = |(QFRj-QFRi)-(DBFRj-DBFRi)|/((QFRj-QFRi)+(DBFRj-DBFRi))$$

a valid DB match is defined where (Si-sigma)>0 and the DTij>0.1
Where $QFRj$ is the jth query frame time value, $QFRi$ is the ith query frame time value, $DBFRj$ is the reference video frame time value which matches to the jth query frame, $DBFRi$ is the reference video frame time value which matches to the ith query frame, and where K is a constant that is learned or inferred by testing and analysis for most accurate results.
The sequence score for a matching sequence between query Q0 and reference DB0 over a time window WIN1 can be calculated as $$\text{seq\_score\_}Q0\_DB0\_WIN1 = \Sigma(\text{over } i=0 \text{ to } N-1; \text{ and } j=i+1)\{(\max(Eij^*((Si\text{-sigma})(Sj\text{-sigma})/L)^*\text{power}((1-(DTij),2))+A\} \quad \text{(eqn 3)}$$

The summation is from the first element to the last matching signature pairs in a video sequence. Each signature pair consists of a query signature and a reference video signature and their associated frame numbers.
for all queries in series: 0, 1, 2, . . . i, . . . j, . . . N
where L, A are constants that are learned or inferred by testing and analysis for most accurate results.
Alternately, the sequence score for a matching sequence between query Q0 and reference DB0 over a time window WIN2 can be calculated as $$\text{seq\_score\_}Q0\_DB0\_WIN2 = \Sigma(\text{over } i=0 \text{ to } N)\{(\max(Si\text{-sigma})\} \quad \text{(eqn 4)}$$

for all queries in series: 0, 1, 2, . . . i, . . . j, . . . N
where L, A are constants that are learned or inferred by testing and analysis for most accurate results.
and where WIN1, WIN2 are each a sequence window length; the sequence length represents the number of frames in the matching sequence.
Alternately the sequence score can be calculated as from frame match scores as follows $$\text{seq\_score\_}Q0\_DB0\_WIN2 = (\text{over } i=0 \text{ to } M)\{(\max(FSi)\} \quad \text{(eqn 5)}$$

for all queries frames in series: 0, 1, 2, . . . i, . . . M
where FSi is the frame similarity score for each query frame i $$FSi = \Sigma(\text{over } k=0 \text{ to } L)\{\max(Si)\}/(L+1) \quad \text{(eqn 6)}$$

Where L+1 queries are relevant signatures for query frame i
Next, we define the sequence threshold values to decide whether the sequence scoreseq_score_Q0_DB0_WIN1 in equation 3, or the sequence score seq_score_Q0_DB0_WIN2 in equation 4 represents a valid sequence for a selected sequence window length have been found experimentally or through learning.
Thresholding for sequences whose scores are defined by a non-linear approximation uses equation 7.
For the selected sequence window WIN1

$$\text{Thresh1} = \text{RATE}^*\text{power}((WIN1),NL) \quad \text{(eqn 7)}$$

where RATE is constant;
where NL is constant 0.5, and power is a function that generates computes WIN1 raised to NL
An alternate to generate the thresholding for sequences uses equation 8.
For the selected sequence window W $$\text{Thresh2} = fn((W,N,TR,M)) \quad \text{(eqn 8)}$$

where sequence window W is set to the length of the matching query segment;

where N is number of query signatures, M is number of matching query and reference database pairs, and TR is the relative time ratio calculated by TR=1+abs (Slope−1/Slope) where Slope is the slope of a line of a query and a reference matching sequence. The line can be drawn by connecting the matching sequence's starting and ending points; with reference signature time values on the x-axis and the query time values on the y-axis.

A correlation score between two close matches or points near the matching time lines of query video frames to database frames of the same video sequence is generated. The individual frame similarity score and the frame distance correlation between the query and matching database time segments are used to calculate the strength of the match between the query and reference video. If the calculated strength is greater than a threshold or is among the best such strengths calculated for the query section, based on the two selected points near the matching time line, this detected sequence may be stored for evaluating the uniqueness of the query signature.

An appropriate weight based on certain measures, such as a "unique information measure", is applied to the query individual signature scores. Signatures are analyzed at the bit level by bit error distances measurements between signatures of the same video within a certain time window and signatures of the entire dataset of reference video signatures or with signatures of a dictionary of frequent signatures. A dictionary of frequent signatures is a collection of frequent signatures generated from one or more video reference databases, where each signature has more than a prespecified number of similar matching signatures within a certain bit error distance. One such measure can replace or contribute to the term Eij in equations 1 and 3. For example, an appropriate weight is determined by equation 9:

the reference. The merge step combines the separate matching sections for the query to generate a best matching longer sequence that combines separate or broken or overlapping matching sections. Refinement, is limited to varying the end points in the previous detected sequence and attempt to produce a better matching sequence. Due to the fast compute method for a first sequence match, and hence the general use of merged sequences, some points may be missed that would provide a better match. Thus, refining or iteration methods may be used to improve the detection of matching sequences.

At step 313, video sequence selection is performed across a large set of detected video sequences and further performs iterations to extend the detected video sequences. Output 314 represents video sequences detected from multiple parallel search systems or search partitions that are transferred to step 315 to display the results along with matching statistics, such as likelihood of match.

A trend correlation is computed as series of iterative correlations using the query and reference signatures. For example, in video search a first correlation is between two matching frames of a query video and a reference video, where the two matching frames are separated in time. The next correlation is performed using a first trend line, where the first trend line is generated from the previous two matching frames separated by some time and the next best matching frame. A line is drawn by connecting a first matching point and a second matching point and plotting a time value of the reference on the x axis and a time value of the query on the y axis. So the trend correlation method iteratively attempts to find the best trend line using actual frames. This method may also perform a trend line correlation in parallel for multiple overlapping separate partial queries from the initial query, and finally picks the best combination for many overlapping choices. For example, a query having a duration of 15 seconds may be separated into multiple overlapping queries. One

---

For QSig{i}, where QSig{i} is Query Signature for the ith matching item
    if the best Si between QSig{i} and the next Query frame signatures is less than a Limit,
and QSig{i} is not in the dictionary list, where Si is the similarity score;
        Weight = 1;
    Else if the best Si between QSig{i} and the next Query frame signatures is greater, or
equal to the Limit, and QSig{i} is not in the dictionary list;
        Weight = (Si − Limit)/MaxSimScore; where MaxSimScore is the maximum
similarity score;
    Else
        Weight = 0                                               Equation 9

---

In a step for pre-processing and creating a video database, if a number of similar signatures are less than a prespecified threshold, then the selected video signature is considered to have "unique information content". For example, if a signature is more unique, there would be fewer matches in the database. Measures of unique information content, include the STF in a video database 226 and the distances between the signatures in the queries.

At step 313, separately detected sequences for an identified database video are merged. The video identification process involves breaking the query video into multiple overlapping sections of the query. Each of these separate and overlapping query sections can match with different sections of the reference video. A query video may generate many separate overlapping or gapped matching sequences. Some of the query sections can thus match overlapping or separate sections of a reference video. Since the first step of finding likely matches of a query to reference videos, as described above, is very fast there may be gaps and errors in the time alignment of query to query can be from 0 to 4 seconds, and the next from 1 to 5 secs, and so forth. The above methods describe a refining adaptive trend correlation that is forgiving to variations occurring due to localized edits. The above method is also very accurate since it gives weight to similarity, trend gaps that occur in time or space, and optionally to rate of variation in individually correlated signatures in time or space. Equations 1 and 3 describe the segment and sequence scoring for this method.

An alternate method of trend correlation uses a Hough Transform where many bins are created for a presently analyzed trend line. In a Hough Transform, a line and its neighborhood is represented by a bin. The Hough Transform separates different lines into different bins. The goal is to find the strongest trend line, and the bin with the highest score, which is generated from the matching features and signatures, is selected to be the strongest trend line. All points on a line and its neighborhood are collected in a specified bin. Another trend line with an offset on the x-axis is assigned to another bin. Similarly, a trend line with a different slope belongs to another bin. For example, one bin may represent an offset of zero on the x-axis and a slope of 1 for the line x=y. Another bin may represent an offset of 100 on the x-axis and a slope of 2 for the line x=2y. For a query, the matching candidates are allocated to each of the above bins, and the bin with the highest score is selected as the trend line. Equation 4 describes sequence scoring for this method.

The correlation score calculations can be performed in various ways such as using a sum of signature correlation scores where each correlation score is the similarity score multiplied by the size or uniqueness of detected feature. Adding an uniqueness factor to equation 4 or adding an entropy factor to equation 4 is similar to using Eij in equation 1.

Each of the above methods uses a short sample of the query to detect a trend correlation between the query and reference signatures.

In another embodiment, the Hough Transform is used for fast performance of video sequence trend establishment in which the bins represent a segment of a line and not a complete line. In this case, each bin represents a segment of a line, with neighboring regions of the segment within a prespecified distance, on a plot of matching signatures with query time on the y-axis and the reference time on the x-axis. A characteristic of this approach is the speed achieved by reducing the Hough Transform computations from a complete line to a line segment, thereby reducing the number of valid combinations of slopes and x-offsets that would have been calculated. By reducing these possible combinations and in turn the number of bins to be evaluated, and reducing the number of valid matching candidate signatures significant speedup is achieved. The segment based Hough Transform is implemented by organizing the reference into chapters and sections and performing a trend correlation only on the relevant chapter or chapters in the reference database. As described above, a chapter represents a certain time section of the reference and a trend correlation involves a similarity search to generate a candidate list and then involves performing a Hough Transform or another trend correlation algorithm.

FIG. 3B illustrates a video search method 320 used to identify a reference signature sequence that matches the query video. This figure describes similar steps as used in FIG. 3A, and also includes steps for generating the data structures while implementing the method. This method also highlights the use of caching at steps 325, 327, and 328 and 329 by remembering and using previously computed signature comparisons and sequence matches. The additions to the caching lists are made at steps 334, 335, and 337.

For every query video signature 321, a video database similarity search 322 is performed on databases, such as a hash index database at access step 323. The nearest video frames signatures, also referred to as a candidate list in 324, are combined with candidates from searches with other signatures for an analyzed query frame to identify a selected list of likely videos, a top videos list 325. A new candidate list 326 is generated using the same or a longer query sequence to identify new potential sequences. Next, in step 327, candidates 326 for each query are correlated to identify potential sequences. In step 328, a detailed sequence or frame analysis is performed by combining various sub-segments of correlated frames or frame segments of the query and the reference video. Sequences are merged, combined, and evaluated in step 329. In step 331 the likely video or videos are selected based on a thresholding decision made on the likelihood of each matching sequence. The query process for small query sections is repeated by going back to step 321. Step 332 reports the results and selected results may be displayed in step 333 which shows a sample result list having a matching video name, a query start frame (Q St Fr), a query end frame (Q End Fr), a reference video start frame (DB St Fr), a reference video end frame (DB End Fr), and a likelihood of a match as a confidence value.

In an alternate embodiment, the candidates 324 returned from similarity search 322 are stored in a cached hash table constructed from video and query id and video and query frame locations. The cached candidate lists are stored at 334 and 335. The cached lists are accessed by various steps required for video identification, including step 325 and step 327. Additional caching of candidates is performed in step 337 which is accessed by further video identification operations 328, 329, and 331.

In an alternate embodiment, the object identification method of FIG. 3A can be used to identify an object where the object views represent a sequence of images similar to a video sequence. Although an object query can be generated as sequence for a particular set of object views, there is much more complexity for the database reference object since there are many possibilities of viewing it. Hence, if the reference object is stored in all possible sequences there would be an exponential increase in the database. An approach to resolve the complexity of having all these possibilities in the reference database is to use spatial geometry alignment in correlation processing, as described in more detail below.

At step 303, a database access is performed using the traversal index generated in step 302, for retrieval of the leaf nodes for associated data. Then, in step 304, a distance measure or error between the individual query signatures and the likely database signatures is computed. The traversal index of step 302, is a cluster index which is directly generated from the content belonging to the detected feature. Other attributes of the extracted feature such as spatial location, size, and bright blob or dark blob, color, texture, transparency, reflectivity information can be used to contribute to the first database index.

At step 305, the matching signatures are processed to select the most likely matching objects and their corresponding perspective views. Each object can be divided into multiple sections based on the perspective views described as object views or chapters in FIG. 3A. From these selected sets of matching object views and associated query, a longer query is constructed and a fast similarity search performed using an exact matching technique.

At step 307, the candidate set for the selected object views with extended queries is then correlated. At step 307, the location of the detected object is then inferred from the inputs of the matching signatures. Step 307 is generally performed on signatures that agree at the cluster level, and hence is a very fast operation. After step 307, it can be inferred that the query view matches an exact perspective view of the reference object. Then detailed analysis and refining of the matching object views can be performed by using all the signatures that are available for the matching query and reference perspective alignments.

The operations of computing a correlation score between a query object views and the reference object views are performed in step 309. Step 309 generally uses the signatures to refine the match and for false positive analysis. The step 309 involves further calculations to extend the correlation results generated initially when the signature level correlation for the query and reference object views is performed in step 307. The above correlations of step 307 identify a small set of likely matching objects. For each likely matching object, the probability of matching between query and reference object view is calculated and a correlation score is generated in step

307. The signature level correlation scores from step 309 identify similar perspective views between a query and an reference object. Step 309 is also used for refining the match location, and also for a false positive analysis.

For every likely matching of the reference object with the query views, a more detailed correlation between the query and reference object is performed using the object index database accessed at step 311. The object index database accessed at step 311 is indexed based on object identity and perspective of the object view. In step 313, false positive analysis is performed between the matching video segments or matching video frames or various video features.

At step 313, separately detected views for a matching database object are merged. The object identification process involves breaking the query views into multiple overlapping views of the query. Each of these separate and overlapping query sections can match with different sections of the reference object. A query object may generate many separate overlapping or gapped matching sequences. Some of the query sections can thus match overlapping or separate sections of the reference object. Since the first step of finding a likely query match to a reference object, as described above, is very fast there may be gaps and errors in the perspective alignment of query to the reference. The merge step combines the separate matching views for the query to generate a refined matching 3D views that combines separate or broken or overlapping matching perspective views. A 3D view of the matching object can be composed from the features of the object that match the query. Since the object features have 3D spatial data, a 3D view can be constructed. Since different query views are used to match an object, overlaying the best matching views and features of the query allows a reconstruction of the 3D sections of the matching reference object. The reconstructed reference object is a 3D view of the object as observed when the query was generated.

At step 313, object selection is performed across a large set of detected objects and further performs iterations to extend the detected object views. Output 314 represents objects detected from multiple parallel search systems or search partitions that are transferred to step 315 to display the results along with matching statistics such as likelihood of match.

The computation of the correlation score of an object based spatial correlation is described below. The correlation score and object score defined below are calculated in step 307 and in steps 309, and 313.

corr_score_Q0_DB0 is the spatial correlation score between a query object view and reference object.

$$\text{corr\_score\_Q0\_DB0} = \Sigma(\max(E_{ij}*((S_i-\text{sigma})(S_j-\text{sigma})/K)*(1-DS_{ij})^2) \quad (\text{eqn 9})$$

where $E_{ij}$=entropy between correlated queries i and j; the entropy is calculated as the signature bit difference between neighboring queries i and j.

Si=the similarity score of item "i" of the matching sequence between query and reference object signatures, Sj=the similarity score of item "j" of the matching sequence between query and reference object signatures, $$Si = \text{MaxScore} - \Sigma(\text{over bits } 0 \text{ to } L-1)(QSig\{i\} \text{ XOR } RSig\{i\})$$

Where QSig{i} is Query Signature, and RSig{i} is Reference Signature for ith matching item; and there are L bits in the signature.

Sigma=is a constant, $DS_{ij}$=is the spatial distance correlation between queries i and j and the associated reference object for the queries i and j $$DS_{ij} = |(QSP_j - QSP_i) - (DBSP_j - DBSP_i)| / ((QSP_j - QSP_i) + (DBSP_j - DBSP_i))$$

where query j>query i; and where j is the next element that has a valid DB match in the query series: 0, 1, 2, ... i, ... j, ... N for the last entry to be checked a valid DB match is defined where (Si-sigma)>0 and the $DS_{ij}$>0.1

$QSP_j$ is the jth query image, $QSP_i$ is ith query image, $DBSP_j$ is jth matching reference object view, $DBSP_i$ is ith matching reference object view and where K is a constant, and is learned or inferred by testing and analysis for most accurate results.

$$\text{obj\_score\_Q0\_DB0\_VW1} = \Sigma(\text{over } i=0 \text{ to } N-1; \text{ and } j=i+1) \{\max(E_{ij}*((S_i-\text{sigma})(S_j-\text{sigma})/L)*\text{power}((1-(DT_{ij}),2))+A\} \quad (\text{eqn 10})$$

for all queries in series: 0, 1, 2, ... i, ... j, ... N where L, A are constants are learned or inferred by testing and analysis for most accurate results.

and where VW1 is a partial view of the object. The view window is a perspective view of a reference physical object that matches to the query. It essentially represents a 3D view of an object, but may be partial since it may not include all perspectives of the object. The threshold values for the partial view of the object have been found experimentally or through learning.

Thresholding for identifying an object for a selected view are defined by a non-linear approximation For the selected view window VW1

$$\text{Thresh} = \text{FEAT}*\text{power}((VW1), NL)$$

where FEAT is constant;
where NL is constant 0.5

In another alternate embodiment, the object views and spatial information are used to correlate with the query signatures from various view points and correlation utilizes the spatial distances between the queries and between the references of a pair or more of matching signatures. Similar to the time difference or time slope used for video sequence identification, geometric correlation can be performed using the co-ordinate alignments of the query and reference matching features or views.

Figure 3C:
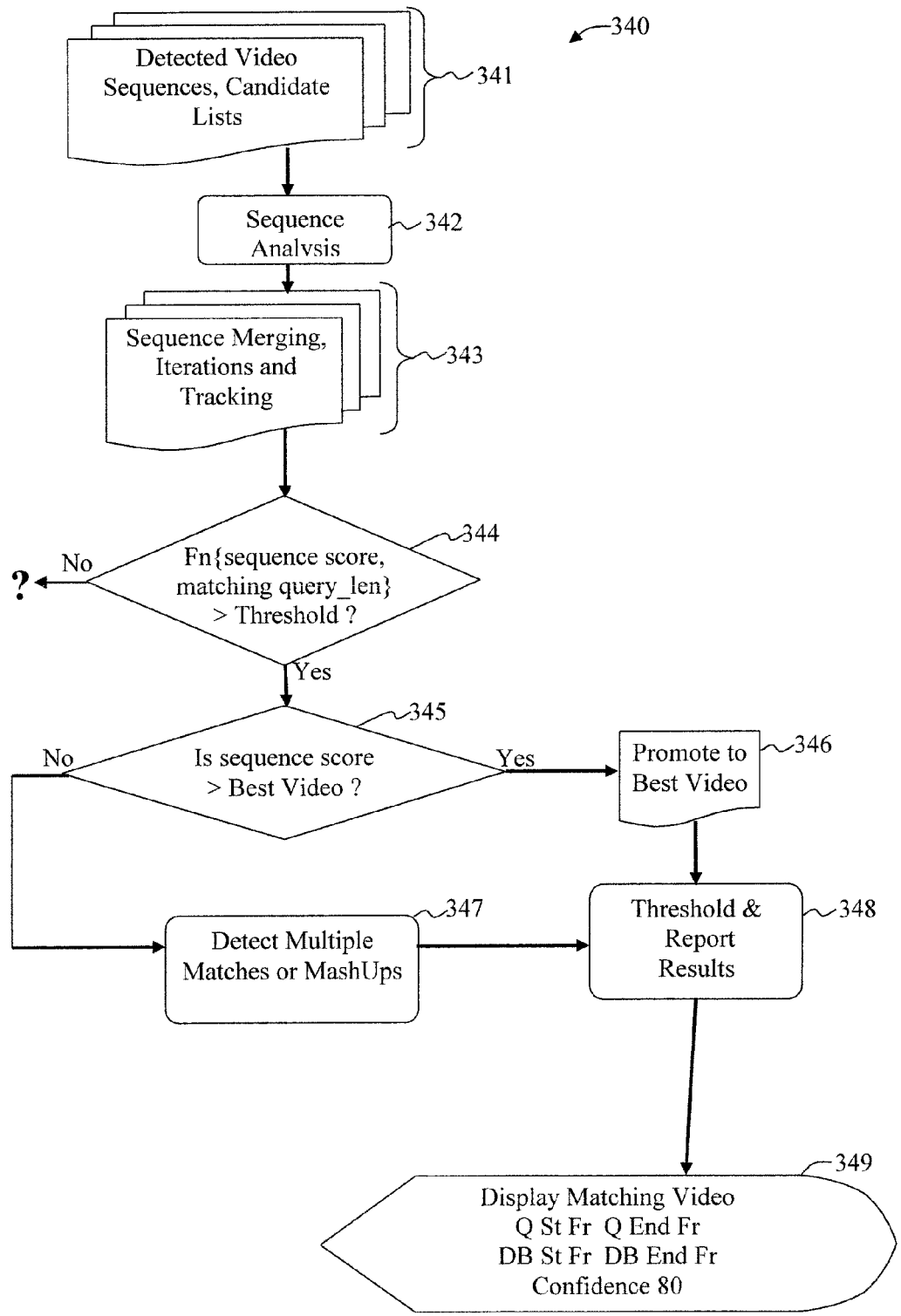
FIG. 3C illustrates an alternate method that takes as an input matching pairs of query and reference video segments and performs correlation and classification on the matching reference video segments to the query video in accordance with the present invention.

FIG. 3C illustrates a video search method 340 used to evaluate a set of matching query signature sequences from a query video and matching reference video sequences. For every query video sequence detected in step 341, a detailed sequence or frame analysis is performed in step 342 on the sub-segments of correlating frames or frame segments of query and reference video. In step 343, the surviving detected sequences are further processed to improve detected sequences. The detected sequences can be improved by merging of gapped or overlapping detected sequences, and then by iterating the merged detected sequences. Iteration is a process of changing the time value of the matching sequence endpoints, and evaluating the sequence. One benefits of using iteration is to improve the accuracy of the matching sequence by finding a better sequence in the neighborhood of current found sequence. Another benefit of using iteration is the ability to increase the length of previously found match by extending towards the start and towards the end of the query. Additionally, if a query indeed matches separate sections of a reference video, that can be taken into account. In step 344, each matching video and sequence or sequences are evaluated to determine if the combined sequence scores are greater than a threshold.

$$(\text{seq\_score\_}Q0\_DB0\_W1+\text{seq\_score\_}Q0\_DB0\_W2+\text{seq\_score\_}Q0\_DB0\_W3)>fn((W1+W2+W3),N,TR,M) \quad \text{eqn 11}$$

where the 3 matching sequences are of lengths W1, W2, W3, and N is total number of queries, and TR is the relative time ratio calculated by TR=1+abs(Slope−1/Slope) where Slope is the slope of a line of a query and a reference matching sequence. The line can be drawn by connecting the matching sequence's starting and ending points, with reference signature time values on the x-axis and the query time values on the y-axis. M is the number of matching query and reference pairs.

If so, the set of sequences of a query video are selected as a matching video. Else, the video is not selected as a matching video, eliminated, and not shown in the results. The scores for each matching video and its matching sequence or sequences are evaluated in step 345 to determine the best matching video. The best matching video is generated in step 346. If different best matching video or videos occur at different times, then a best matching video list is reported. This usually happens if the query video is composed from multiple reference videos and such a query is called a mash-up video. The matching videos are passed to a threshold and reporting unit in step 348. Step 347 performs an optimization step targeted to resolve mash-up queries. Step 347 prunes matching query and references which overlap with stronger and different matches, and combines scores of different and separate sequences that match to the same reference video and iterates each matching sequence to try to improve the matching sequence. Step 347 is performed on a set of best matching sequences. Selected results may be displayed in step 349.

The merging process for detected sequences is performed for both overlapping and non overlapping sequences. One method performs correlation to evaluate a potential merged sequence by combining two matching sequences. If the potential merged sequence's relative correlated score is proportionally greater than the previous best sequence, then an update of the detected sequence is performed, while the previous best sequence and new sequence are eliminated. Another method uses a frame by frame or locator specific correlation analysis before performing the same process to merge sequences as above.

A sequence refinement method uses an iterative extension of detected sequence. This again considers a potential extended sequence and performs correlation and updates to the extended sequence if the relative correlation score is improved. An alternate method evaluates this extension by performing frame by frame or locator specific correlation before iterating or updating the sequence.

FIG. 4A illustrates a method 400 for performing distributed search on multiple machines or partitions. A set of query indexes 401 derived from a query video sequence is received in step 401. In step 402, a database index is used to access leaf nodes for associated data and associated indexes which are stored in memory at step 403. At step 403, a similarity search computation is performed, which involves reading the leaf nodes for associated data. Then, in step 404, in a similar manner as described at step 304 of FIG. 3A above, a distance measure or error between the individual query signatures and the likely database signatures is computed. Next, from the detected video candidates a small list of likely videos are selected similar to the description for step 305 in FIG. 3A. Similarly, step 407 is used to generate a matching sequence using correlation of matching candidates, as described in 307 of FIG. 3A. At step 409, a correlation is performed between all the signatures belonging to the query video and reference video along the line defined by the detected start and end time of the query and the reference. However note, that in step 409, all the signatures along the trend line are directly compared using accesses to the second database at step 411 using only video and time index. Step 409 produces a much more accurate and detailed comparison compared to step 407 which involved only signatures that agreed with the cluster database index bits. If the query index and the reference index are an exact match then for a particular query, the reference signature can be compared by direct access. If the query index bits have known weak bits or if one bit of the index is allowed to be in error; the reference signature can be compared by doing multiple direct accesses. Weak bits in a hash index are those that are most likely to switch from a "0" to "1" or vice versa. This may be determined from the original value of each signature dimension before binarization if they are close to the threshold. Step 413, performs sequence merging and refining that are similar to operations at step 313 of FIG. 3A. At step 415, the final sequences from multiple parallel databases and correlation partitions are compared and sorted to produce the final results. After correlation, the final results are combined at step 415. FIG. 4B, described below, shows how the quality of each match can be measured which is a correlation step that can be included or added to step 413 in FIG. 4A.

FIG. 4B illustrates a post processing method 420 employed to determine the confidence with which the system can estimate if a matching segment of an reference video 422 and a query video 421 are similar. At step 423, the signatures of a candidate video, starting with an identified start frame, for each frame thereafter, are compared with database signatures related to the query video sequence. At step 423, the score for each candidate is computed, and then the accumulated correlation score for the sequence is computed.

Further, at step 423, computations for false positive sequence analysis is conducted. Various factors, such as the percentage of matches found for each query signature, the total correlation score, the slope of the matching time based trend line, the correlation scores for other information such as color, texture, audio matching, or appearance, and geometric matching can be used to generate individual feature correlation score. Geometric correlation strength can be used as factor at the individual signature correlation, or at the frame level or for the entire matching sequence. A simple geometric correlation calculates how well two matching pairs of query and reference features agree in terms of geometric aspects such as size, spatial distance, and direction. For example, two matching pairs of features {Qi, Ri} and {Qj, Rj} may be assessed, where Qi is the query feature and Ri is the reference feature that match and similarly Qj and Rj are another pair that match. The geometric agreement is good when Size(Qi)/Size(Qj)~=Size(Ri)/Size(Rj). Other aspects of geometry such as co-ordinate location and distance between the queries of a pair and the ratio of the size of the queries can be used. Other geometric measures can also be used to verify alignment of three pairs of matching features.

Taking into account aspects of the above, the quality of the sequence match can be evaluated. From the various correlation scores for different features, such as correlations scores for color, audio, texture, motion based information, total correlation score, total query length, slope of the matching time based trend line, and geometric correlation scores, a function is used to calculate a confidence score for the detected sequence. This confidence score shows the relative quality or accuracy of the detected match. The confidence score is different from the simple accumulated value of sequence correlation as in equation 3. The calculated confidence score is compared in step 424 with a threshold that takes into account the total query information including the various scores, for example Fn {score1, score2 . . . query_info}>threshold may be calculated. Additional correlation measures may be developed and utilized as denoted by the step 425. For each of the previously detected sequences for a particular query, if the confidence score of the video sequence is greater than the threshold, the sequence is added to a list of matching sequences. The threshold that is used to select a sequence can be based on various factors. The user is enabled to define this threshold. The user is supplied with an accuracy chart that describes the false positive rate and true positive identification rates for each type of distortion or variation of the content quality. With this information, the user can decide what accuracy values are necessary for their application.

Additionally, the types of features used to estimate the confidence score may be added or reduced to meet the user requirements for accuracy and system complexity. For example, color signatures can be generated for the reference and query video and then used to generate a correlation score for each matching sequence. The color correlation score is then used to increase or decrease the confidence of a sequence match. The results using color are more accurate than without using color. However there is a compute cost associated with generating the signatures and for correlation processing. The results list, which is a list of matching sequences, reports the identity of a matching reference video and the time alignment of the match in step 426 and may utilize other analysis and decisions provided by step 425. For example, step 425 may include other decisions using additional feature correlations, which are not included in step 423, based on text from captions, or text from video frames, or color, or texture or video image background, or audio. Step 427 operates to display the list of matching sequences, where Q St Fr represents a query start frame, Q End Fr represents a query end frame, DB St Fr represents a matching reference video start frame, DB End represents a matching reference video end frame.

FIG. 5 illustrates a method 500 that may suitably be employed to select database signatures that are more unique thus having increased information content as compared to those signatures that are determined to be less unique. These selected signatures optimize the likelihood of differentiating between the many video sequences stored in the video database. In an embodiment of the present invention high information signatures are selected from the database in the method 500. For example, video frames 501 or objects 502, after image processing treatment of the video frames or objects, are further processed in step 503 to generate signatures. At step 506, a uniqueness analysis is conducted to generate values TF and IDF representing the uniqueness of the signatures. These signatures are compared in step 506 with database signatures accessed from a video database at step 510, for example. Also, at step 506, signatures with high information content relative to other relevant signatures in the video database are retained. Based on the uniqueness of the signatures and other control parameters, such as priority of a video sequence, which is defined by user based on a value of the video content, or total signatures present per video sequence as determined in step 506, selected signatures are provided at output 507 and stored in the video database at step 522. The two versions of the video database associated with a retrieval step 510 and a storage step 522 are provided so that a fast cluster database search may be provided through the use of hash indexes at step 510 and a fast detailed sequence checking using different thresholds for signature selection may be provided at step 522. The fast cluster database search is performed by accessing the database using the hash index of the query.

One embodiment database information with high uniqueness based on a signature term frequency (STF) is selected. If the term frequency (STF) of signatures within a very small distance of the generated signature is large, this signature is not preferred. Another signature that includes more unique information is preferred for selection, the uniqueness is directly related to the number of similar signatures within a specified distance measure. Step 516 of FIG. 5, performs the calculations of a uniqueness measure and other database statistics, such as a count of similar signatures within different bit error distances and a count of similar signatures within a certain time window. The statistics measures are stored in step 518. Further the database statistics calculated in step 516, and individual video analysis from output 507 are combined in step 520 to generate the video databases which includes content based cluster index and video id based index and which are stored in step 522.

In another embodiment, two pass operations are performed in step 516 of FIG. 5 to generate a high information content database. In a first pass, video database statistics are generated. Signatures are analyzed by bit error distances with signatures of the same video within a certain time window and/or with the entire dataset of video signatures for video collections and/or with a dictionary of frequent signatures. Next, the total unique information content of each video sequence, such as a chapter or sliding time window, is evaluated. A sliding window refers to a fixed time window with respect to the current time. When a sliding window is used, signatures from current signature are compared with signatures with current time plus an incremental time of the sliding window. One method selects signatures that are more unique when compared to the signatures within a chapter and to the signatures for an entire window. This method is fast and also lends to fast updates when new content is to be added.

While processing the video database signatures for the second database for detailed correlation, signatures that that are more unique are kept in the database. In typical use the second database uses a relatively lower level of uniqueness compared to the first database. In some cases no signatures are eliminated from the second database. The database retains primarily high information content signatures that retain most of the differentiating information of each database element or video sequence. A measure of the uniqueness of each individual signature and a sum of unique signatures measured for a particular object or video clip are tracked so as to ensure sufficient information content is in database to be able to identify the video clip or object. In order to make a measure of unique information content within a query, or more specifically query video, is important to determine the error bounds of a matching reference. For example, if the information content of a selected segment of the query video is very high then relative higher error bounds of a matching reference video can be used since the higher information content in the query reduces the probability of error in the match. The total information content in the query video can be calculated by a summation of uniqueness values of individual signatures. A method to establish the uniqueness values comprises finding and counting similar signatures within certain bit distance, and further to generate an uniqueness factor using logarithmic or another function of the count. For example, the uniqueness value can be calculated as a logarithm of an inverse of the count of the number of similar matching signatures.

Figure 6:
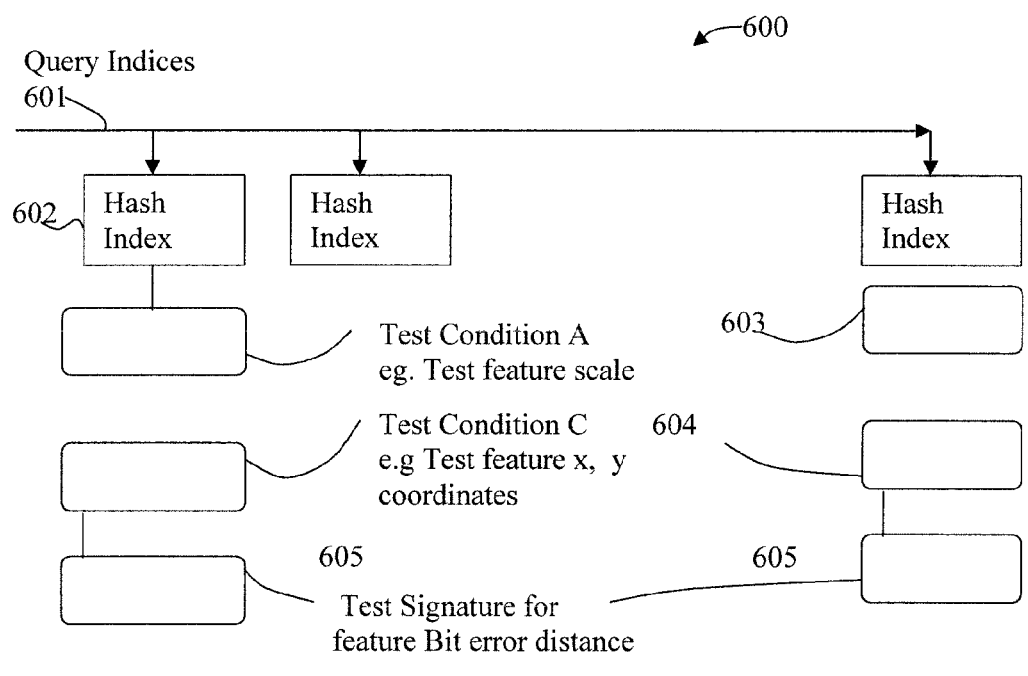
FIG. 6 illustrates a method to perform similarity search on signatures in the database.

FIG. 6 shows a similarity search operation 600 using the fast cluster search video database, such as the first database 109 of FIG. 1. A query signature and a query hash index are provided as input on input 601. Each query signature is looked up in the first database 109 by using a hash index 602 to select closely matching signatures in the reference first database 109 of FIG. 1. Reference signatures that meet certain conditions such as spatial location, scale size are selected and tested for distance to the query signature. Step 603 checks whether the associated data, including a feature scale size associated with the matching signatures, are within expected bounds for matching pairs. As described in FIG. 4B at step 423, the associated data which includes geometric information, including scale size and x and y coordinates, is used while performing false positive analysis. Step 604, checks whether the associated data, x, y coordinates of the matching signatures or pairs of signatures, are within certain bounds of the feature location specified by its x, y co-ordinates. At step 605, bitwise signature comparison using leaf node signatures is performed, and signatures that are within a certain distance or bit error are retained and placed in to candidate set. An alternate order for similarity search can be performed or certain steps can be eliminated if performance can be improved for a specific application.

Figure 7:
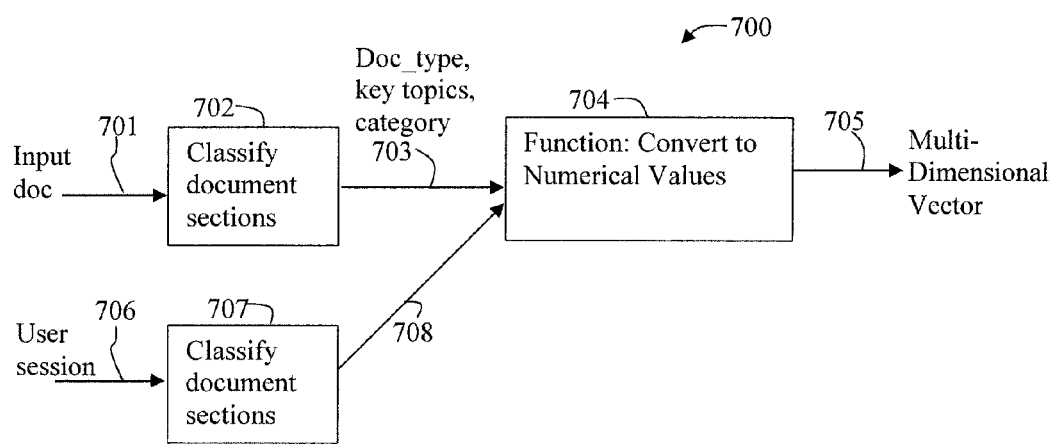
FIG. 7 shows an alternative method of converting data base entries into multi-dimensional vectors which can be used to efficiently perform lookup in accordance with the present invention.

FIG. 7 describes a method to generate a multi-dimensional vector to describe a class of multi-media content. In particular method 700 includes, classifying an incoming media clip 701 into different aspects in step 702. A first set of dimensions 703 such as media type, category, classification, etc. are transferred as input to step 704. At step 702 and step 707, depending on input type, such input is classified into various aspects where each aspect provides a dimension. After classification at step 704, a multi-dimensional vector is generated to describe the descriptor for each class.

In a similar manner to step 702, user session information 706 may be classified into various activity types in step 707. A second set of dimensions 708, such as a combination of sequence of events, for example, a user session, and a classification of documents selected and of queries are transferred as input to step 704. The first and second set of dimensions 703 and 708 are converted into numerical terms in step 704 to generate a multi-dimensional vector 705, that includes multiple descriptors. The advantages of this method include a very efficient ability to add new documents to update a database, to find similar documents or duplicates and to perform searches of databases.

FIG. 8 shows an video identification method 900 wherein reference content or image sequence is fingerprinted, data base is formed, similarity search and correlation are performed in accordance with the present invention. The method 900 includes, includes receiving an incoming image sequence 901 and pre-processing that sequence into different aspects in step 902. Results of the preprocessing in step 902 are utilized in step 907 where motion segmentation is used to separate parts of the same object, or a complete object. Motion segmentation relies on the fact that objects or parts move together in a video clip. Detected features 903 and other information including extracted objects and feature 908 generated in step 907 are transferred to step 914. In step 914 the multi-dimensional inputs 903 and 908 are used to select area or objects of interest and, after normalization for orientation and diameter, are processed into numerical terms in step 904 to generate a multi-dimensional vector 905. In step 909, search operation is performed. The nearest matching results 910 are used to generate correlation scores in step 911 which are further processed to generate sequence correlation scores in step 912. At step 913, the likely matching objects or video clips are evaluated using database signatures accessed from the video index second database accessed in step 915. This step 913 is generally referred to as false positive analysis. For efficient access of the database for false positive analysis, the second database is indexed by video and frame numbers. The best matching results for each incoming image sequence which constitutes the query are stored as scores and reported.

The method 900 of FIG. 8 includes a correlation ensemble of a set of matching frames or sequences between the reference video and query video. A correlation ensemble is a set of individual correlations of matching frames and individual sequences. A correlation ensemble can also include correlations using signatures derived from different features. The correlation ensembles from this set of matching frames and sequences is processed by a classifier and a determination is made if the query and video frame and sequence are similar. This method enables detection of heavily edited versions of a reference video.

Figure 9:
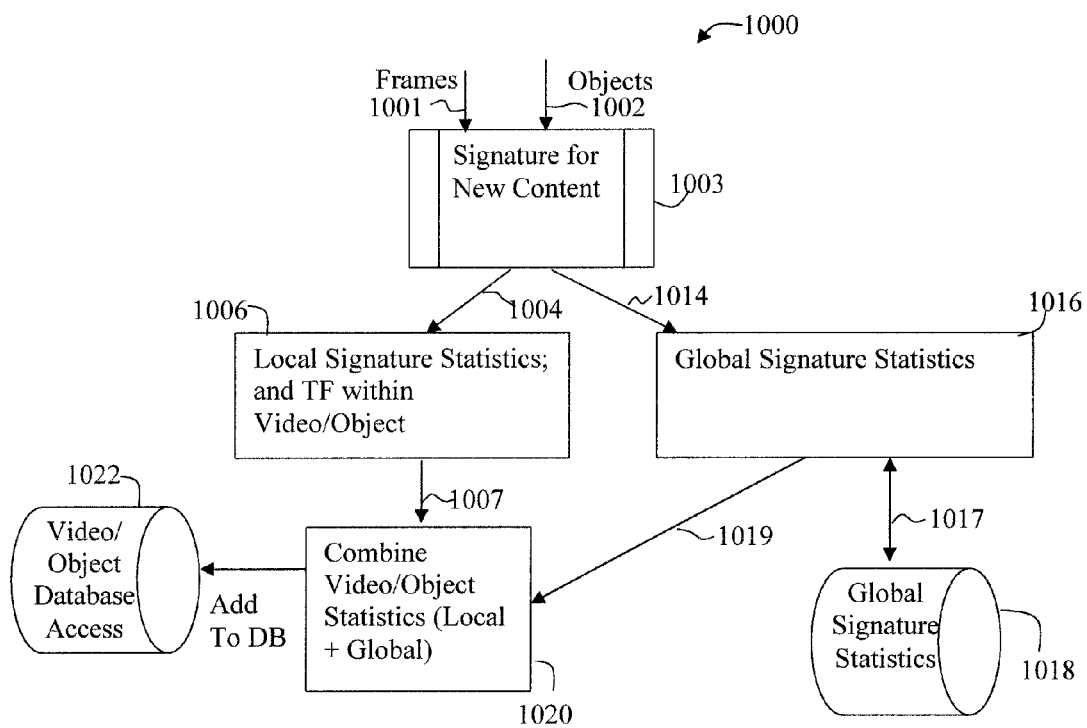
FIG. 9 shows a system wherein the database is updated by adding new reference content signatures using an update method in accordance with the present invention.

FIG. 9 illustrates a method 1000 to add new video content to existing video databases. This method selects database signatures that are more unique to be added which results in more efficient use and accuracy of stored content in the video databases. These selected signatures optimize the likelihood of differentiating between the many video sequences stored. The method 1000 selects more unique content signatures in the video database 1022. The new content is input as video frames 1001 or objects 1002, which are processed in step 1003 to generate signatures in a similar manner as described for step 516 in FIG. 5. These signatures are compared amongst themselves in step 1006 using the frame distance as a factor. Step 1006 compares all the signatures to others in the database to generate signature statistics. In step 1016, the signature information statistics, such as, a number of similar matching signatures with certain bit distances and a number of matching signatures with certain time window, for the new content are updated on output 1017 by adding previously calculated global signature statistics in step 1018. Global signature statistics are calculated by counting the occurrence of few more repeated words as discovered from previous and current databases. The statistics calculated by steps 1006 and 1016 are combined in step 1020. At step 1022, signatures with high information content, for the new content, relative to the rest of the signatures in the video database are added to the video databases. Based on the uniqueness of the signatures and other control parameters, such as priority of a video sequence, or total signatures present per video sequence at combined step 1020, the selected keys are retained and stored at video database storage step 1022.

In an alternate, two video databases can be used, one for fast cluster search and another for fast detailed sequence checking which can use different thresholds for signature selection. As described in step 516 of FIG. 5, different uniqueness thresholds can be used for the first database for fast correlation. The second database may be used for false positive analysis and database accuracy improvements. Additional databases that store other features can also be used. Alternatively, additional feature information can be stored as associated data in the first and second databases. For performance reasons, some feature information may be stored in the first database and an overlapping but larger feature set stored in second database as associated data.

Figure 10:
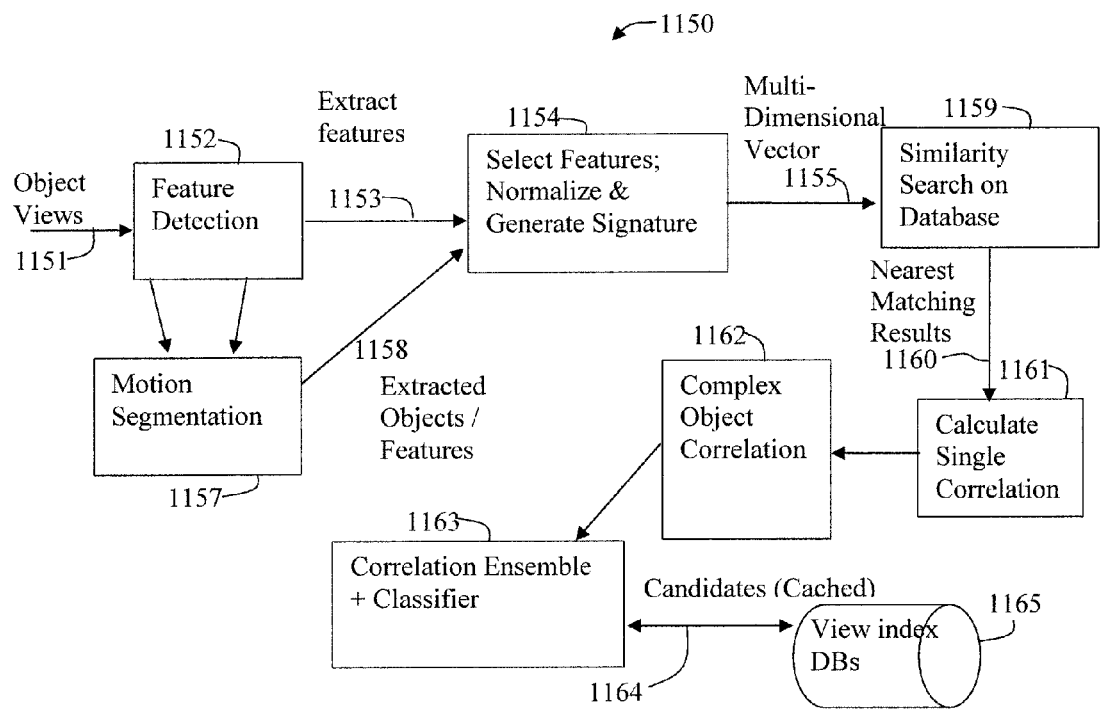
FIG. 10 shows an object identification method wherein reference objects are processed to generate a database of multi-dimensional vectors and includes complex object correlation steps in accordance with the present invention.

FIG. 10 shows an object identification method 1150 wherein reference objects are processed to generate a database of multi-dimensional vectors and includes complex object correlation steps in accordance with the present invention. The method 1150 of FIG. 10 includes, receiving an incoming set of object views 1151 and pre-processing that sequence into different aspects in step 1152. The incoming set of object views may be constructed from a 3D model generated from a video source or stereo image, or a set of images of query object. For example we have a person that is captured by camcorder. One embodiment for recognizing the face of the person is to generate a 3D model from the various frame images of the person. With a 3D model, 2D views of the 3D model can be generated. The 2D views generated from a 3D model tend to be more accurate and can be generated in a determined sequence which can simplify the process of correlating individual feature and view matching.

Features detected which include interest regions and contours and gradient edges in step 1152. At step 1157, motion segmentation is performed to extract parts of objects or an entire object using its motion information. Extracted objects or object features 1158 and contours and keypoints detected in 1152 are transferred in 1153 to step 1154. At step 1154 the multi-dimensional inputs are combined to make decisions to select area or objects of interest and, after normalization for orientation and diameter, are processed into numerical terms in step 1154 to generate a multi-dimensional vector 1155. To detect object or feature which are invariant to rotation, predominant orientation of the entire feature or object is determined. Similarly the size of detected feature or object is determined and normalized. Normalization is useful so it can match similar feature that is smaller or larger. In step 1159, a database search operation is performed. This comprises of access the database and performing comparisons to find the similar signatures. The nearest matching results 1160 are used to generate correlation scores including likely objects and the likely views in step 1161 which are further processed to generate geometric correlation scores in step 1162. Geometric correlation between a set of matching features is performed using associated data of signatures such as scale (size), and co-ordinate location. In one mode, the geometric correlation score can be the agreement between two separate matching features and/or the agreement between the relative sizes of the query features and the reference features and the geometric angles of distances. The agreement as described above can be tolerance values for exact equivalent values. For example, for a matching pair of query and reference signatures, if the query size ratio is two, then the expected reference size ratio is also two. However, by allowing for error in detection, errors due to image size, and other image and processing effects, a tolerance can be allowed around the expected value of two. If the reference size ratio is within a 2+/− tolerance, then the query pairs agree with the reference pairs. The geometric alignment factors are combined to generate an overall geometric correlation score. The geometric alignment factors can include comparing a size ratio of a query pair to a reference pair.

At step 1163, the likely matching objects are again evaluated using database signatures using the object index database, including the first database and the second database, as accessed in step 1165. The algorithmic operations are a correlation ensemble and a classifier to identify matching objects. For efficient access of the database during this detailed classification step, the first and second databases are indexed by index1 composed of object id and object view perspective, and index2 composed of feature content and feature attributes. The best matching results for each incoming image sequence which constitutes the query are stored as scores and reported.

The method 1150 includes a correlation ensemble, part of step 1163 of a set of matching view points or view sequences between the reference object and query object. The correlation ensembles, similar to equation 10, or variations from equation 4, from this set of matching view points or view sequences is processed by a classifier, part of step 1163, and a determination is made if the query and reference object view points or view sequences are similar. This method enables detection of heavily distorted or obfuscated versions of a reference object where some parts of the query object views match very closely to the reference object, but some sections may be damaged or missing.

Those of skill in the art will appreciate that based on the present disclosure additional alternative systems and methods for multi-media content identification using multi-level content signature correlation and fast similarity search may be determined in accordance with the disclosed principles of the present invention. Thus, while particular embodiments and applications of the present invention have been illustrated and described, it is to be understood that the invention is not limited to the precise construction and components disclosed herein and that various modifications, changes and variations which will be apparent to those of ordinary skill in the art may be made in the arrangement, operation and details of the method and apparatus of the present invention disclosed herein without departing from the spirit and scope of the invention as defined in the appended claims.

We claim:

1. A method of preprocessing media content for storage and access in a media reference database, the method comprising:
generating a signature term frequency (STF) for a signature of provided media content in a first media reference database, wherein the STF is a frequency of occurrence of the signature in the first media reference database and represents a measure of uniqueness for the signature as compared to existing signatures in the first media reference database; and
entering the signature using a hash index in a second media reference database, wherein the STF of the signature is less than a specified threshold, wherein the specified threshold represents a level of information content and uniqueness for the signature.

2. The method of claim 1 further comprising:
correlating selected query signatures with signatures stored in the second media reference database to determine a possible detected media sequence by making a first access of the second media reference database for a selected query signature using a first hash index and making a second access of the second media reference database for the selected query signature using a second hash index, wherein a bit that is close to a threshold for determining a state of the bit in the first hash index is changed to an opposite state for the second hash index.

3. The method of claim 1, wherein the STF is generated for each signature by combining the number of times each signature appears in a same reference content within a specified time window and the number of times each signature occurs in the first media reference database.

4. The method of claim 1, wherein the STF is generated for each signature by combining the number of times each signature appears in a same reference content.

5. The method of claim 1 wherein the STF is increased by a large value for each signature when the signature is similar to a signature in a dictionary list, wherein a distance measure is used to detect similarity of signatures on the dictionary list which includes a selected list of frequently occurring signatures observed from current and previous databases.

6. The method of claim 1, further comprising:
entering each signature in a dictionary of frequent signatures that is a collection of frequent signatures generated from one or more video reference databases, where each signature has more than a specified number of similar matching signatures within a certain bit error distance.

7. A method to detect a query sequence of audio and video signatures in a data base of audio and video signatures, the method comprising:
searching the database of audio and video signatures in response to a query sequence of audio and video signatures using a hash index for each query signature;
retrieving a set of database signatures that are similar as determined by a distance measure of the audio and video signatures to the query sequence of audio and video signatures in response to use of the hash index for each query signature to select a database entry;
generating a correlation in time score between corresponding pairs of signatures from the set of database signatures and the query sequence of audio and video signatures, wherein the correlation in time score is based on a first similarity score between a first query and a first reference signature, a second similarity score between a second query and a second reference signature, and a frame correlation between frames for the first query, the second query, and associated reference frames; and
identifying a matching sequence between query and reference if the correlation in time score is above a determined threshold.

8. The method of claim 7, further comprising:
accessing a second database and performing a correlation in time between corresponding pairs of signatures from a second set of database signatures and the query sequence of audio and video signatures, wherein the second database is indexed by video id and time location.

9. The method of claim 7 wherein correlation is performed in spatial domain using x,y locations of matching feature points and scale of matching feature points, and which are used as factors in calculating a final correlation score for pairs of matching reference and query signatures.

10. The method of claim 7, further comprising:
performing a correlation in space between corresponding pairs of signatures from a second set of database signatures and the query sequence of video signatures using spatial information in the associated data of the signatures, wherein the second database is indexed by video id and time location.

11. The method of claim 7 further comprising:
sub-dividing audio and video into smaller chapters based on time; and
searching the data base of audio and video signatures in a cluster search by use of a cluster index to detect chapters of the matching audio and video sequence, wherein the individual reference audio and video are sub-divided into smaller chapters and the most likely audio and video chapters are returned as a result of the cluster search.

12. The method of claim 11, further comprising:
detecting a likely time location of a matching video section, wherein a query consists of multiple overlapping query windows.

13. The method of claim 7 further comprising:
binning using a segment based Hough transform for segments of multiple trend lines within a selected range of query and original video frames as part of a correlation method to detect a best matching sequence within matching reference audio and video sequences; and
selecting a best bin.

14. The method of claim 7 further comprising:
performing frame to frame signature correlation on a detected trend line to generate a correlation score; and
thresholding the correlation score of matching sequences or individual frames to detect a matching sequence.

15. The method of claim 7, further comprising;
merging detected sequences that are overlapping and have similar slopes to generate merged overlapping sequences, wherein slopes are calculated for lines between matching sequences' starting and ending points with reference signature time values on an x-axis and query time values on a y-axis;
merging detected sequences that are not-overlapping with a gap between the detected sequences and have similar slopes to generate merged non-overlapping sequences;
combining the merged overlapping sequences and the merged non-overlapping sequences to generate merged sequences; and
retaining in the database of audio and video signatures the merged sequences that have relatively better correlation score as compared to a previously detected original or best merged sequence.

16. The method of claim 7, further comprising:
identifying an exact start and an end of a matching sequence between query and original videos;
iteratively extending the query and original start or end frame numbers so as to evaluate iteratively longer sequences; and
retaining extended sequences that have a relatively better correlation score to improve the accuracy of detected sequences.

17. The method of claim 7 further comprising:
performing in parallel a similarity search and a time correlation on separate partitions of the database of audio and video signatures;
sorting detected sequences according to a measure of the similarity of signatures; and
selecting best matches to report to a user.

18. The method of claim 7 further comprising:
weighing individual signatures in one or more databases based on uniqueness of each signature.

19. The method of claim 7 further comprising:
accessing a different database generated using orthogonal information to that in the data base of audio and video signatures; and
performing a correlation in time between corresponding pairs of signatures from an orthogonal set of database signatures and the query sequence of audio and video signatures.

20. The method of claim 7 further comprising:
performing trend correlation for an extended query and original sequence to enabling faster correlation; and
enabling a wider viewpoint detection.

21. A method of generating a score for confidence of matching a query media sequence with a reference media sequence, the method comprising:
generating a feature correlation score based on a correlation between multiple signatures of matching frames of the query media sequence and the reference media sequence;
generating a sequence correlation score using relative differences in frame numbers of the reference media sequence and the query media sequence;
generating a match confidence score based on a function of the feature correlation score and the sequence correlation score for the reference media sequence and the query media sequence; and adding the reference media sequence with a generated match confidence score that exceeds a selectable confidence threshold to a list of matching media sequences, wherein the selectable confidence threshold is selected based on an accuracy chart that describes a false positive rate for types of distortion in content quality.

22. A method of performing fast sequence correlation comprising:

performing a fast similarity search using a direct hash index of signatures to identify a first plurality of likely matching chapters of a query media sequence and a reference media sequence;

performing a sequence correlation on a reference chapter and a query chapter to identify a second plurality of likely matching chapters of the query media sequence and the reference media sequence;

performing the fast similarity search and the sequence correlation in parallel on separate partitions of a reference database having a plurality of reference media sequences;

thresholding the first plurality of likely matching chapters and the second plurality of likely matching chapters to eliminate reference media sequences that have a low likelihood of matching and to determine a plurality of most likely matching reference media sequences; and selecting the best matches from among the plurality of the most likely matching reference media sequences.

23. The method of claim 22 further comprising:

using a classifier with input from multiple matching sequences of media content to identify the separate partitions of the reference database that are likely to have matching media content.

* * * * *